US008809751B2

(12) United States Patent
Ellis et al.

(10) Patent No.: US 8,809,751 B2
(45) Date of Patent: *Aug. 19, 2014

(54) MODULAR HEATER SYSTEM

(75) Inventors: Eric Ellis, Columbia, MO (US); Troy Ruben Bolton, Fulton, MO (US); Jacob Lindley, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1094 days.

This patent is subject to a terminal disclaimer.

(21) Appl. No.: 12/351,041

(22) Filed: Jan. 9, 2009

(65) Prior Publication Data
US 2009/0179022 A1 Jul. 16, 2009

Related U.S. Application Data

(63) Continuation-in-part of application No. 11/520,130, filed on Sep. 13, 2006, now Pat. No. 7,919,733, which is a continuation-in-part of application No. 11/435,073, filed on May 16, 2006, now Pat. No. 7,964,826, which is a continuation-in-part of application No. 11/199,832, filed on Aug. 9, 2005, now Pat. No. 7,626,146, application No. 12/351,041, which is a continuation-in-part of application No. 11/777,709, filed on Jul. 13, 2007.

(51) Int. Cl.
*H05B 3/44* (2006.01)
*F16L 53/00* (2006.01)

(52) U.S. Cl.
USPC ............ 219/535; 219/544; 219/550; 392/480

(58) Field of Classification Search
None
See application file for complete search history.

(56) References Cited

U.S. PATENT DOCUMENTS

| 1,674,488 | A |   | 6/1928  | Tang           |         |
|-----------|---|---|---------|----------------|---------|
| 2,426,976 | A |   | 9/1947  | Taulman        |         |
| 2,809,268 | A | * | 10/1957 | Heron          | 219/522 |
| 3,296,415 | A | * | 1/1967  | Eisler         | 219/385 |
| 3,955,601 | A |   | 5/1976  | Plummer et al. |         |
| 3,971,416 | A |   | 7/1976  | Johnson        |         |
| RE29,322  | E |   | 7/1977  | Nelson         |         |

(Continued)

FOREIGN PATENT DOCUMENTS

DE 35 44 589 6/1987
DE 20 2005 004602 7/2005

(Continued)

OTHER PUBLICATIONS

Office Action of corresponding JP App. No. 2011-545418, dated Feb. 8, 2013, pp. 1-3.

(Continued)

*Primary Examiner* — Joseph M Pelham
(74) *Attorney, Agent, or Firm* — Brinks Gilson & Lione

(57) ABSTRACT

A heater system is provided that includes a hybrid insulation cover that has a first cover disposed around hinged carrier members and heat trace sections, and a second cover operatively engaged with the first cover and adapted for detachable placement around a heating target and its varying geometries. A flexible insulation jacket having a similar construction as the second cover is also provided for use with connector assemblies. Furthermore, a heater system is provided that includes at least one heat trace section encapsulated within adjacent insulating members for use with heating gaslines and pumplines of semiconductor processing systems.

21 Claims, 50 Drawing Sheets

(56) References Cited

U.S. PATENT DOCUMENTS

| | | | |
|---|---|---|---|
| 4,123,837 A | | 11/1978 | Horner |
| 4,152,577 A | | 5/1979 | Leavines |
| 4,197,449 A | * | 4/1980 | Fessenden .................... 219/549 |
| 4,254,326 A | | 3/1981 | Walker et al. |
| 4,281,238 A | * | 7/1981 | Noma et al. .................. 219/535 |
| 4,293,763 A | * | 10/1981 | McMullan .................... 219/528 |
| 4,365,144 A | * | 12/1982 | Reich et al. .................. 219/535 |
| 4,429,213 A | | 1/1984 | Mathieu |
| 4,575,617 A | * | 3/1986 | Cooper ....................... 219/494 |
| 4,638,510 A | | 1/1987 | Hubbard |
| 4,791,277 A | | 12/1988 | Montierth et al. |
| 4,849,611 A | | 7/1989 | Whitney et al. |
| 5,086,836 A | | 2/1992 | Barth et al. |
| 5,286,952 A | * | 2/1994 | McMills et al. ............. 219/535 |
| 5,294,780 A | | 3/1994 | Montierth et al. |
| 5,296,081 A | * | 3/1994 | Morin et al. .................. 156/498 |
| 5,359,179 A | * | 10/1994 | Desloge et al. .............. 219/535 |
| 5,390,961 A | | 2/1995 | Guthrie |
| 5,537,742 A | | 7/1996 | Le et al. |
| 5,632,919 A | | 5/1997 | MacCracken |
| 5,667,712 A | * | 9/1997 | Sutorius et al. .............. 219/535 |
| 5,714,738 A | * | 2/1998 | Hauschulz et al. .......... 219/535 |
| 5,756,972 A | * | 5/1998 | Vranicar et al. .............. 219/541 |
| 5,864,941 A | | 2/1999 | Baichoo et al. |
| 5,933,574 A | | 8/1999 | Avansino |
| 5,974,227 A | * | 10/1999 | Schave ......................... 392/478 |
| 6,049,658 A | * | 4/2000 | Schave et al. ................. 392/472 |
| 6,111,234 A | * | 8/2000 | Batliwalla et al. ........... 219/549 |
| 6,222,165 B1 | * | 4/2001 | Schwarzkopf ................ 219/535 |
| 6,498,898 B2 | | 12/2002 | Schmitt |
| 6,727,481 B1 | | 4/2004 | Wilds |
| 6,792,200 B2 | | 9/2004 | Hersh |
| 6,839,508 B2 | | 1/2005 | Biess et al. |
| 7,034,254 B2 | * | 4/2006 | Grabowski et al. .......... 219/387 |
| 2003/0052121 A1 | | 3/2003 | Sopory |
| 2006/0278631 A1 | * | 12/2006 | Lee et al. ...................... 219/529 |
| 2007/0108176 A1 | | 5/2007 | Ellis |

FOREIGN PATENT DOCUMENTS

| | | |
|---|---|---|
| EP | 0625669 | 11/1994 |
| EP | 0 937 565 | 8/1999 |
| FR | 2559874 | 8/1985 |
| FR | 2 576 662 | 8/1986 |
| FR | 2 599 115 | 11/1987 |
| JP | 55041646 | 3/1980 |
| JP | 08 326983 | 12/1996 |
| JP | 10060958 | 3/1998 |
| WO | 90/10817 | 9/1990 |
| WO | 97/03540 | 1/1997 |
| WO | 01/56731 | 8/2001 |

OTHER PUBLICATIONS

International Search Report PCT/US2008/069712 (Dec. 18, 2008).
StarFlex Heaters. Glenn Electric Heater Corporation (accessed on Jul. 13, 2007); Retrieved from the internet: url: http://www.glenn-electricheater.com/starflex.html.

* cited by examiner

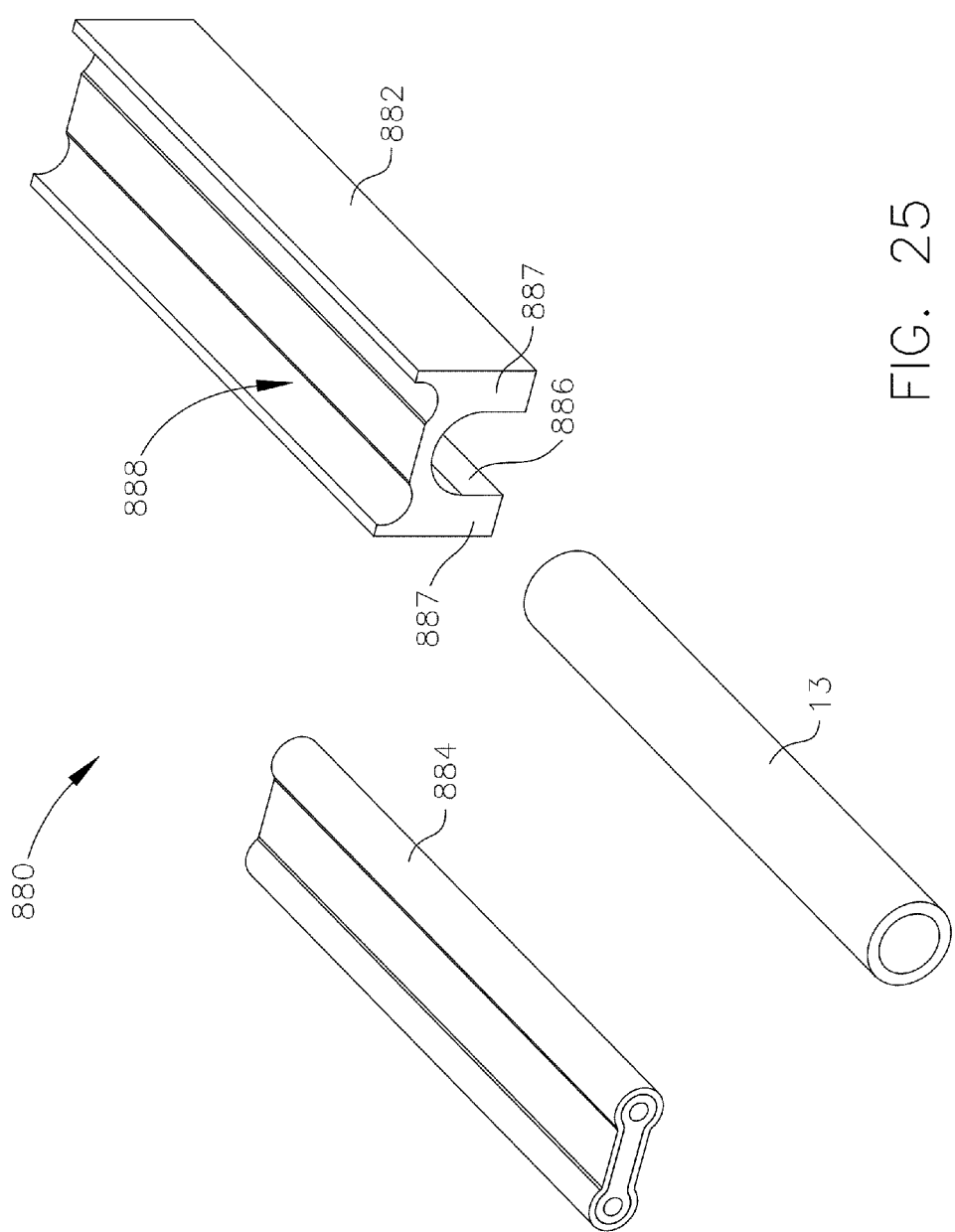

MODULAR HEATER SYSTEM

CROSS-REFERENCE TO RELATED APPLICATIONS

This application is a continuation-in-part of U.S. patent application Ser. No. 11/520,130, titled "Modular Heater Systems," filed on Sep. 13, 2006, which is a continuation-in-part of U.S. patent application Ser. No. 11/435,073, titled "Modular Heater Systems," filed on May 16, 2006, which is a continuation-in-part of U.S. patent application Ser. No. 11/199,832, titled "Modular Heater Systems," filed on Aug. 9, 2005. This application is also a continuation-in-part of U.S. patent application Ser. No. 11/777,709, titled "Modular Heater System," filed on Jul. 13, 2007. The disclosures of the above applications are incorporated herein by reference.

FIELD

The present disclosure relates generally to electric heaters for use in pipelines, and more particularly to electric heaters for use in gaslines and pumplines such as, by way of example, semiconductor processing systems.

BACKGROUND

The statements in this section merely provide background information related to the present disclosure and may not constitute prior art.

The supply of fluids such as oil, gas, and water, among others, from a supply, e.g., an oil well or a water reservoir, requires transfer of such fluids by conduits or the like. Maintaining a free or unrestricted flow of the fluids within the conduits is often necessary, in addition to maintaining the fluid at or above a certain temperature. Presently, an electric heater in the form of a cable or a tape, known in the art as a "heat trace," is commonly used around the conduits to provide heat to the conduits and thus to the fluids. Additionally, the conduits and the heat traces are sometimes surrounded by a thermal insulation jacket to reduce heat loss to the surrounding environment.

Heat trace cables are a popular means for heating such fluid conduits due to their relative simplicity and low cost. Generally, heat trace cables are disposed along the length of the conduits or wrapped around the conduits and are fastened at regular intervals with bands, retaining straps or any other suitable fasteners, as shown in U.S. Pat. No. 5,294,780 to Montierth et al., U.S. Pat. No. 5,086,836 to Barth et al., U.S. Pat. No. 4,791,277 to Montierth et al., U.S. Pat. No. 4,152,577 to Leavines, U.S. Pat. No. 4,123,837 to Horner, U.S. Pat. No. 3,971,416 to Johnson, and U.S. Pat. Reissue No. 29,332 to Bilbro. Fastening heat trace cables to the pipe or conduit has proven to be time consuming and burdensome, particularly for replacement of utility lines and continuous manufacturing processes, among others, where time is of the essence.

To expedite the replacement of utility lines, U.S. Pat. No. 6,792,200 proposes a pre-fabricated heat-traced pipe, wherein a pipe to be heated, a heat trace, and a connector for electrically connecting the heat trace to a power source are cured and integrally formed beforehand and inventoried before a need for replacing an old pipe arises. While this prefabricated pipe saves some time with respect to replacement of utility lines, it requires a custom-made heat-traced pipe, thereby increasing undesirable inventory space and manufacturing and maintenance costs.

SUMMARY

In one form, a heater system is provided that comprises a plurality of hinged carrier members, each hinged carrier member defining an inner periphery surface, an outer receiving portion, and end portions. A plurality of heat trace sections are disposed within the outer receiving portions of the hinged carrier members, the heat trace sections defining end portions. End fittings are disposed proximate the end portions of the hinged carrier members and the end portions of the heat trace sections. A first cover is disposed around at least a portion of the hinged carrier members and the heat trace sections, the first cover being secured to the end fittings, and a second cover is operatively engaged with the first cover and adapted for detachable placement around at least a portion of the hinged carrier members and the heat trace sections.

In another form, a heater system is provided that comprises at least one heat trace section, a first insulating member disposed adjacent the heat trace section, and a second insulating member disposed opposite the first insulating member and adjacent the heat trace section. The first and second insulating members are secured to each other and encapsulate the heat trace section.

In yet another form, a heater system is provided that comprises a thermal insulation jacket having a body defining an outer wall and an inner wall, the body comprising at least one pocket disposed along the inner wall. At least one encapsulated heating element is disposed within the pocket, the encapsulated heating element comprising at least one heat trace section, a first insulating member disposed adjacent the heat trace section, and a second insulating member disposed opposite the first insulating member and adjacent the heat trace section. The first and second insulating members are secured to each other and encapsulate the heat trace section. A cover is disposed around the thermal insulation jacket.

In still another form, a heater system is provided that comprises a plurality of hinged carrier members, each hinged carrier member defining an inner periphery surface, an outer receiving portion, and end portions. A plurality of heat trace sections are disposed within the outer receiving portions of the hinged carrier members, the heat trace sections defining end portions. End fittings are disposed proximate the end portions of the hinged carrier members and the end portions of the heat trace sections. A flexible cover is operatively engaged with the end fittings and adapted for detachable placement around at least a portion of the hinged carrier members and the heat trace sections.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 3 is a perspective view of yet another form of a thermal insulation jacket for a heated conduit constructed in accordance with the teachings of the present disclosure;

FIG. 25 is an exploded perspective view of the heat trace assembly with the carrier in accordance with the teachings of the present disclosure;

Corresponding reference numerals indicate corresponding parts throughout the several views of the drawings.

DETAILED DESCRIPTION

The following description is merely exemplary in nature and is not intended to limit the present disclosure, application, or uses.

The structure of a heater in accordance with the present disclosure is now described in greater detail. At the outset, it should be understood that the word "conduit" as used throughout this specification includes, without limitation, tubes, pipes, and other enclosed or partially enclosed members for the transfer of fluids or other materials such as powders or slurries. The materials carried by the conduits described herein includes solids, liquids, and gases and may include, by way of example, fluids that are transferred within a semiconductor processing apparatus. The following description of the preferred embodiments with reference to such a semiconductor processing apparatus is merely exemplary in nature and is in no way intended to limit the disclosure, its application, or uses. Accordingly, the teachings of the present disclosure are not limited to a semiconductor processing apparatus and can be applied to any system of conduits while remaining within the scope of the present disclosure.

Figure 1:
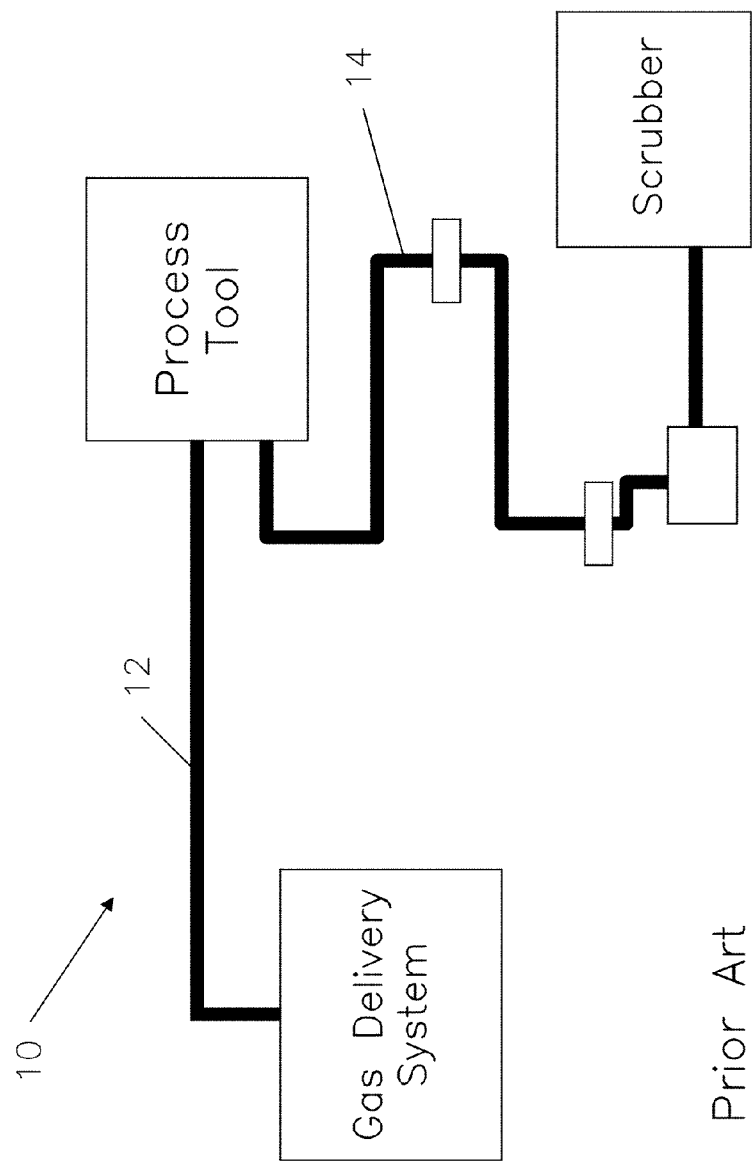
FIG. 1 is a schematic view showing one of the applications of a modular heat trace assembly to heated semiconductor gaslines and pumplines.
Figure 2:
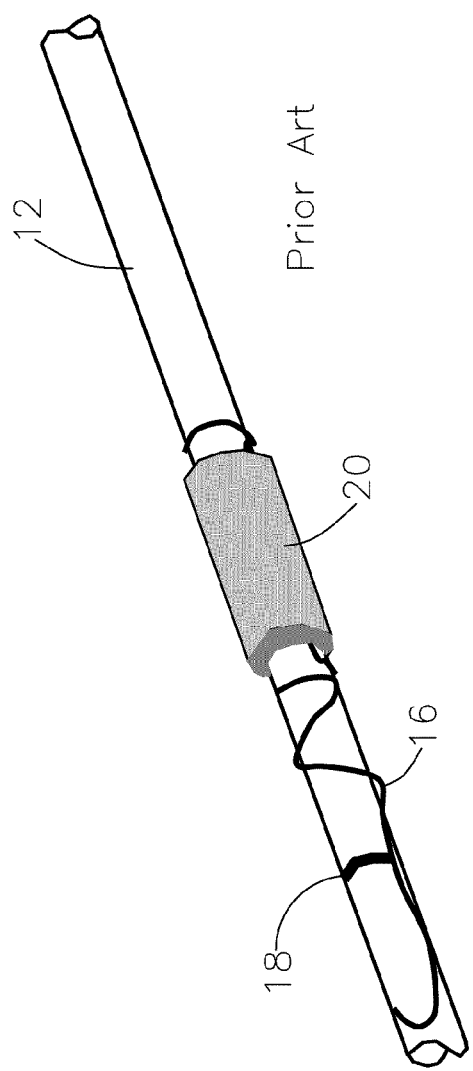
FIG. 2 is a perspective view of a prior art heat trace cable disposed around a gasline or pumpline.

Referring to FIG. 1, a semiconductor processing system 10 is illustrated, which generally includes a heated gasline 12 that extends from a remote gas delivery system to a process tool, and a heated pumpline 14 that extends from the process tool, through a plurality of components as shown, and to a scrubber. During operation, both the gasline 12 and the pumpline 14 must be heated according to specific processing requirements, which has typically been accomplished with heat trace cables 16 as shown in FIG. 2. The heat trace cables 16 are placed or wrapped along the length of the gasline 12 or pumpline 14 as shown, and are secured to the gasline 12 or pumpline 14 using a glass tape 18 or other securing means. Additionally, insulation 20 is often placed around the heat trace cables 16 to reduce heat loss to the outside environment. The insulation 20 is typically wrapped around the heat trace cables 16 and secured in place by separate pieces of tape or ties around the gasline 12 or pumpline 14.

Figure 3:
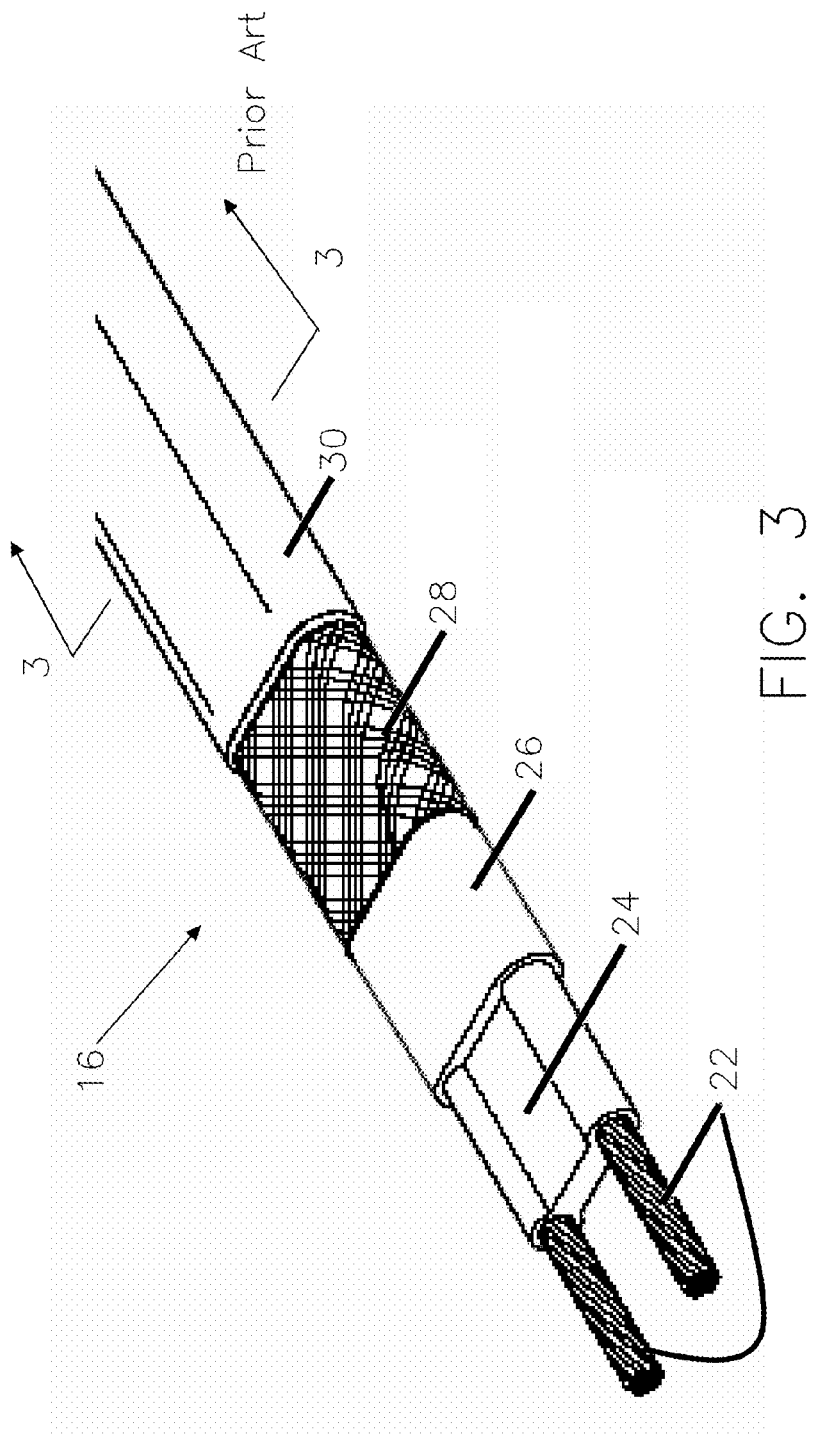
FIG. 3 is a perspective cutaway view of a prior art heat trace cable.
Figure 4:
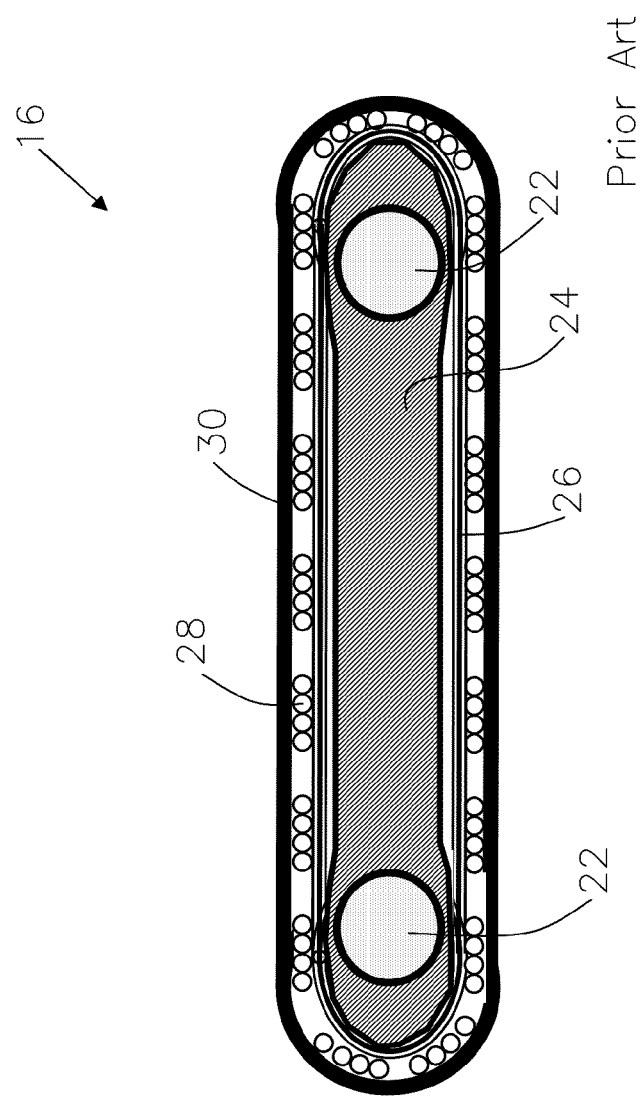
FIG. 4 is a cross-sectional view, taken along line 3-3, of the prior art heat trace cable of FIG. 3.
Figure 5:
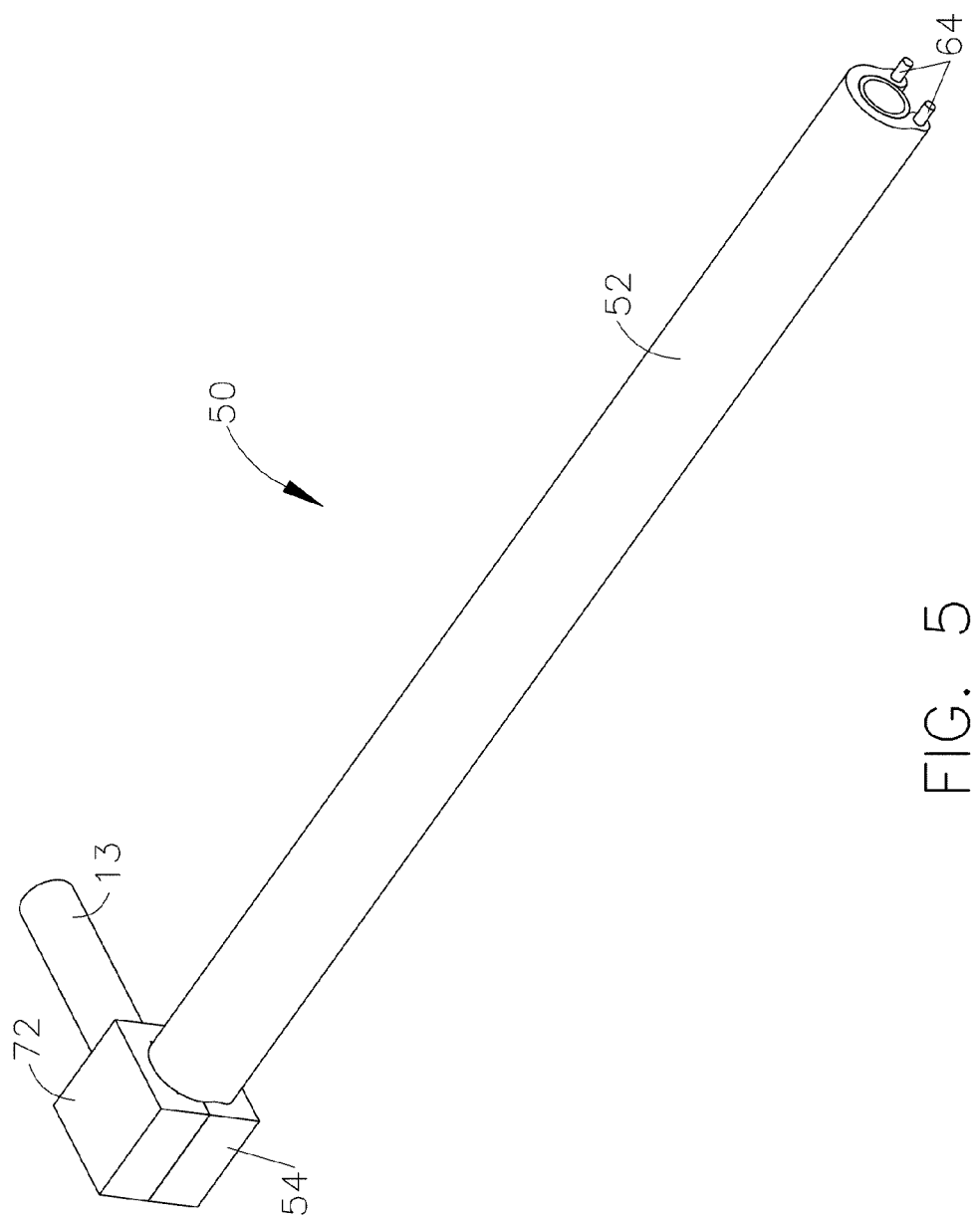
FIG. 5 is a perspective view of a modular heat trace assembly secured to a conduit system in accordance with a first embodiment of the present disclosure.
Figure 6:
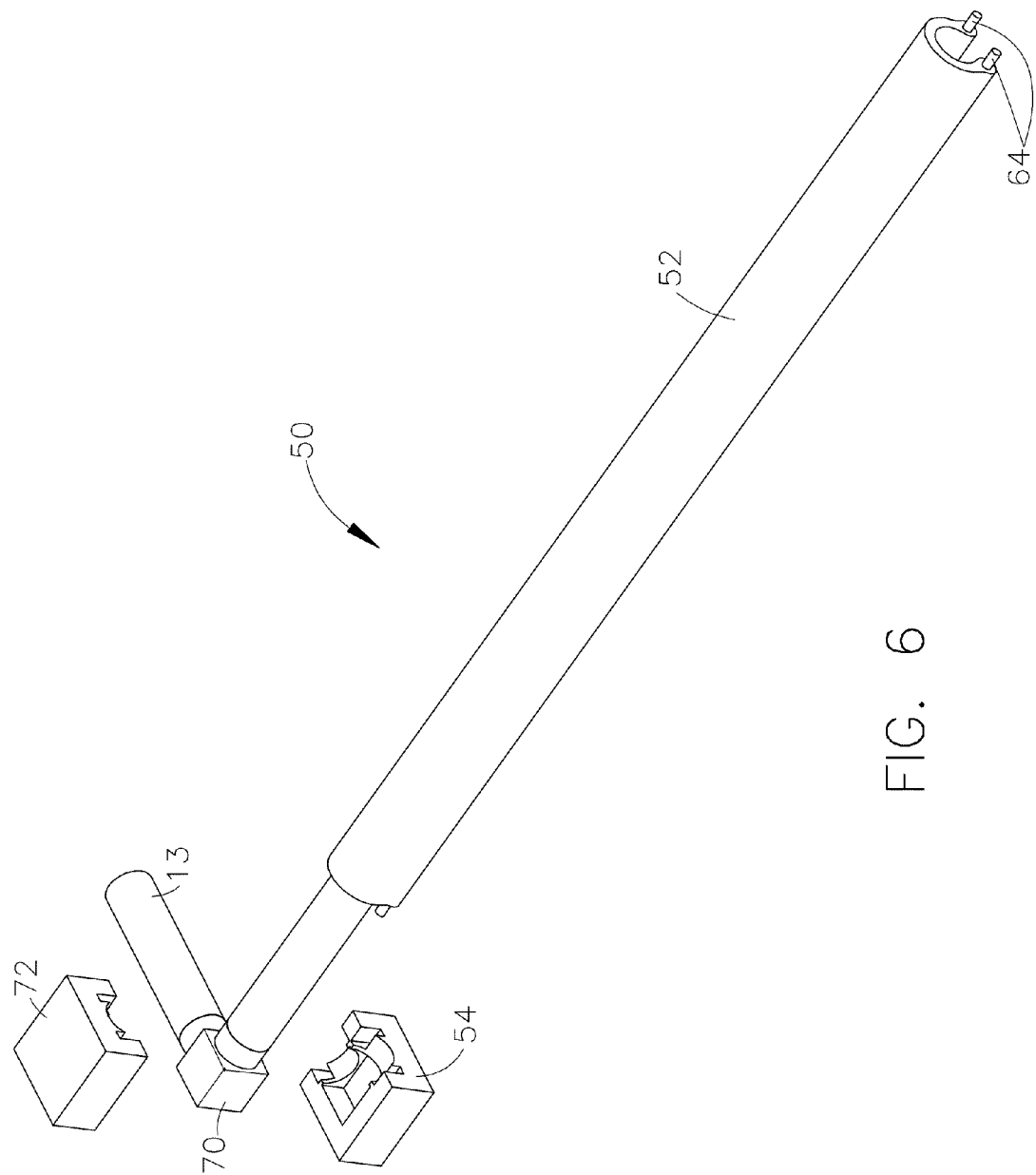
FIG. 6 is an exploded perspective view of the modular heat trace assembly of FIG. 5 in accordance with the teachings of the present disclosure.
Figure 7:
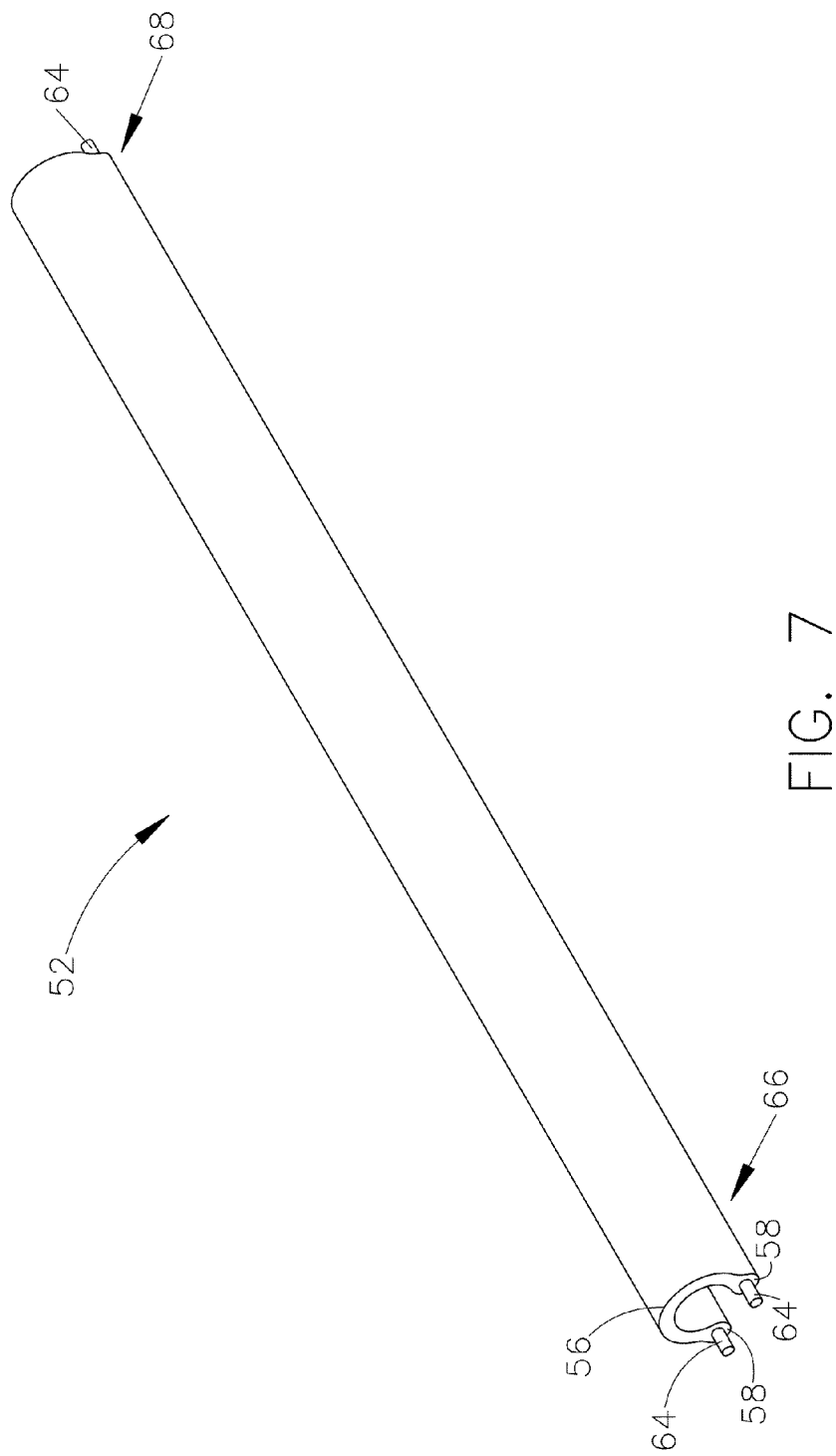
FIG. 7 is a perspective view of a heat trace section of FIGS. 5 and 6 constructed in accordance with the teachings of the present disclosure.
Figure 8:
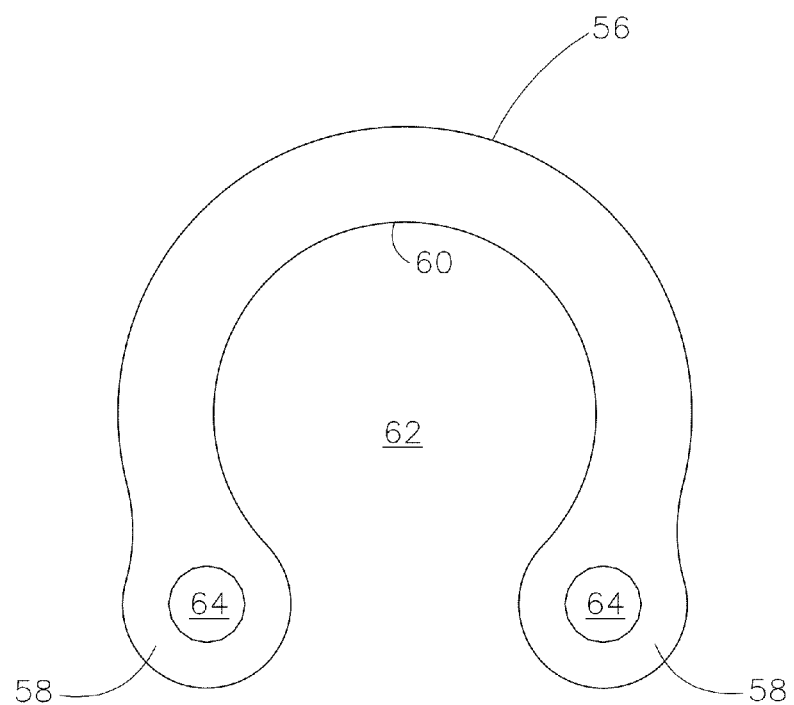
FIG. 8 is an end view of the heat trace section of FIG. 7 in accordance with the teachings of the present disclosure.

Referring to FIGS. 3 and 4, the construction and materials of the heat trace cables 16 are illustrated and described in greater detail. The heat trace cable 16 typically includes a pair of bus-conductors 22, which are surrounded by a semiconductive polymer material 24 that functions as a heating element. A dielectric or insulator material 26 surrounds the semiconductive polymer material 24, which may optionally be surrounded by a metal braid material 28 as shown for additional functionality such as a ground plane. Further, an outer jacket 30 surrounds the metal braid material 28 to protect the overall assembly, and the outer jacket 30 is typically an insulating material such as a thermoplastic.

Although relatively lower cost than other heater systems, heat trace cables 16 must be cut to length in the field and spliced into an appropriate connector or terminal, which is often time consuming and cumbersome. Additionally, heat trace cables 16 are not as capable as other heating systems in providing a relatively uniform heating profile along the length of a conduit due to the limited area of coverage and the relatively crude means by which they are secured to the conduit. Heat trace cables 16 provide only casual contact with the conduit due to their stiffness and difficulty in forming to the shape of the conduit.

With reference now to FIGS. 5 through 8, a modular heat trace assembly adapted for use in a semiconductor processing system 10 in accordance with a first embodiment of the present disclosure is illustrated and generally indicated by reference numeral 50. The modular heat trace assembly 50 comprises heat trace sections 52 for contacting and heating a conduit 13 of the semiconductor processing system 10. The modular heat trace assembly 50 also comprises connectors 54 for securing adjacent heat trace sections 52 and for securing the modular heat trace assembly 50 to components of the semiconductor processing system 10 as described in greater detail below.

The heat trace sections 52 are preferably formed as an elongated shape as shown and include a curved portion 56 and a pair of opposing locking edges 58 extending in a longitudinal direction of the curved portion 56. The curved portion 56 has an inner surface 60 defining an open channel 62 for placement around the conduit 13. The inner surface 60 is preferably complementary to an outer surface of the conduit 13 to allow for securing the heat trace section 52 to the conduit 13. The curved portion 56 preferably surrounds at least a half of the entire outer surface of the conduit 13 to provide more uniform heat transfer from the heat trace section 52 to the conduit 13 and to allow for self-locking of the heat trace section 52 around the conduit 13 by the locking edges 58.

As shown, the locking edges 58 are spaced apart in a direction transverse to the longitudinal axis of the curved portion 56 and are so configured as to facilitate the mounting of the heat trace sections 52 to the conduit 13. Since the heat trace material is flexible, when the channel 62 of the heat trace section 52 is placed around the conduit 13, the locking edges 58 can be deflected outwardly and are then biased against the conduit 13 when released to secure the heat trace section 52 to the conduit 13.

As further shown, a pair of conductors 64 are provided within the heat trace section 52, preferably along the locking edges 58 as shown, wherein the conductors 64 extend outwardly from opposite ends 66 and 68. The conductors 64 are configured for connection to a power source (not shown) for providing heat along the heat trace section 52. The conductors 64 are also adapted, as described in greater detail below, for connection to an adjacent heat trace section 52 or to an adjacent connector 54. Although not illustrated in FIGS. 5 through 8, it should be understood that the heat trace section 52 comprises the semiconductive polymer material, a dielectric or insulator material surrounding the semiconductive polymer material, and may also comprise optional materials for a ground plane and an outer jacket as previously described. These separate materials are not illustrated with the heat trace section 52 for purposes of clarity.

The heat trace sections 52 are preferably preformed in sizes corresponding to different sizes, or outside diameters for example, of the conduit 13. The heat trace sections 52 are also capable of being cut to length, according to a desired length for a particular section of conduit 13. Preferably, the heat trace sections 52 are provided in standard sizes and lengths for ease of repair and replacement within a conduit system such as the semiconductor processing system 10 as shown. Accordingly, the modular construction of the heater system according to the teachings of the present disclosure facilitates a relatively low cost heater system that is easily adapted to a conduit system.

Figure 9:
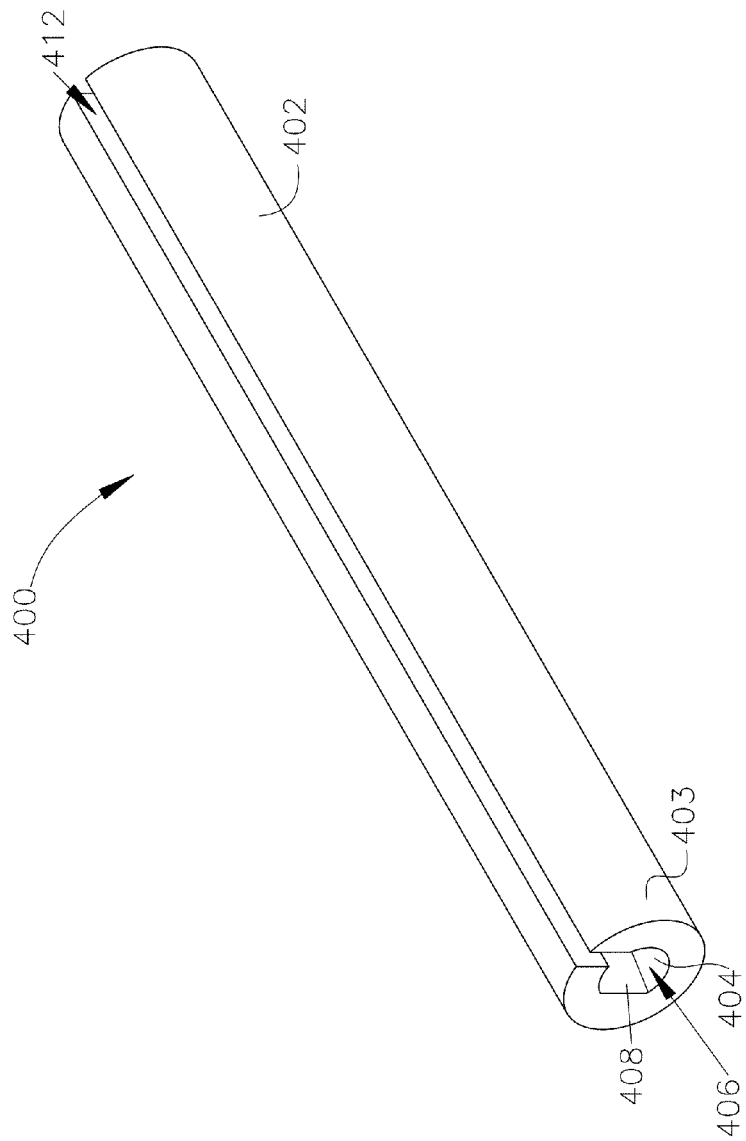
FIG. 9 is a perspective view of a thermal insulation jacket for a heated conduit constructed in accordance with the teachings of the present disclosure.
Figure 10:
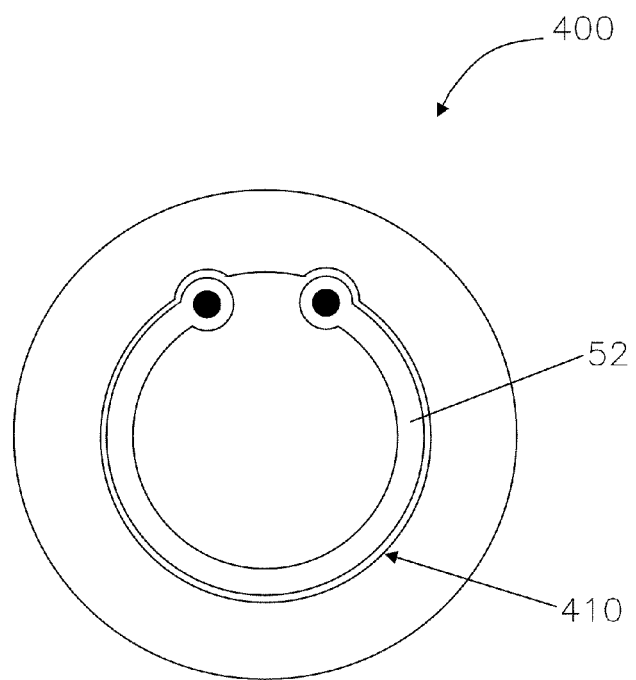
FIG. 10 is an end view of a thermal insulation jacket with an alternate pocket configuration and constructed in accordance with the teachings of the present disclosure.

Referring now to FIG. 9, a thermal insulation jacket for a heat-traced conduit, or a heated conduit (not shown), is generally indicated by reference numeral 400. The thermal insulation jacket 400 preferably defines a tubular insulation body 402, which has an outer wall 403 and an inner wall 404 defining a channel 406 for receiving a heated conduit, which may be a heat-traced conduit as previously described. The inner wall 404 defines a pocket 408 to house a conventional heat trace cable, as previously described, that is placed along the length of a conduit. Alternately, the pocket 408 may take any number of shapes, such as an arcuate pocket 410 as shown in FIG. 10, to accommodate the heat trace section 52 as shown and described herein. Accordingly, the shape of the pocket 408 is designed to mirror or conform to the shape of the heat trace section, whatever that shape might be. Additionally, the thermal insulation jacket 400 having pocket 408 can alternately be provided with a slit 412 so that the jacket 400 can be deformed and placed over a conduit rather than being slid along the length of the conduit. Moreover, the thermal insulation jacket 400 in the configurations as shown can serve to accurately position one or more heat trace sections against the conduit for the purpose of controlling the heat losses to atmosphere.

Figure 11:
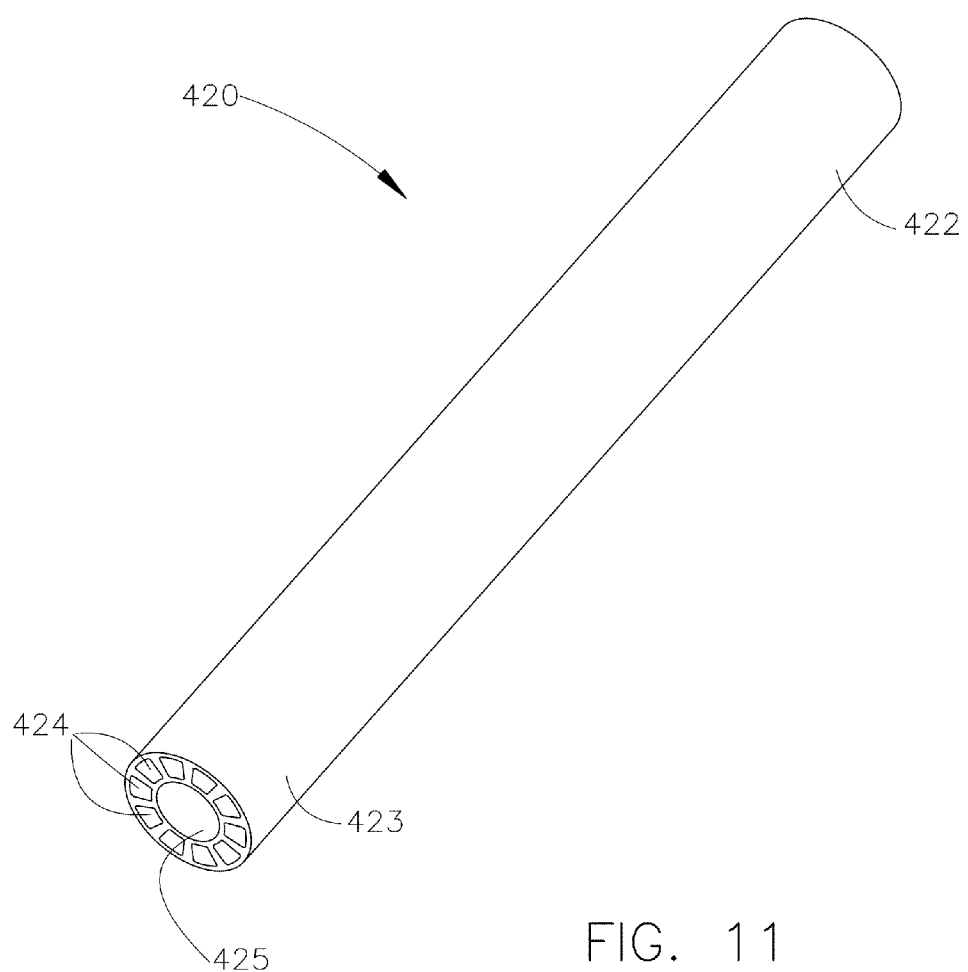
FIG. 11 is a perspective view of another form of a thermal insulation jacket for a heated conduit constructed in accordance with the teachings of the present disclosure.

Referring to FIG. 11, another form of a thermal insulation jacket for a heated conduit is generally indicated by reference numeral 420. The thermal insulation jacket 420 preferably defines a tubular insulation body 422 defining an outer wall 423 and an inner wall 425. The tubular insulation body 422 is formed with a plurality of air chambers 424 extending longitudinally between the outer wall 423 and the inner wall 425 as shown. The air chambers 424 thus provide an area to improve the uniformity of heat dissipation along the heat trace sections and to reduce heat losses through the thermal insulation jacket 420.

Figure 12:
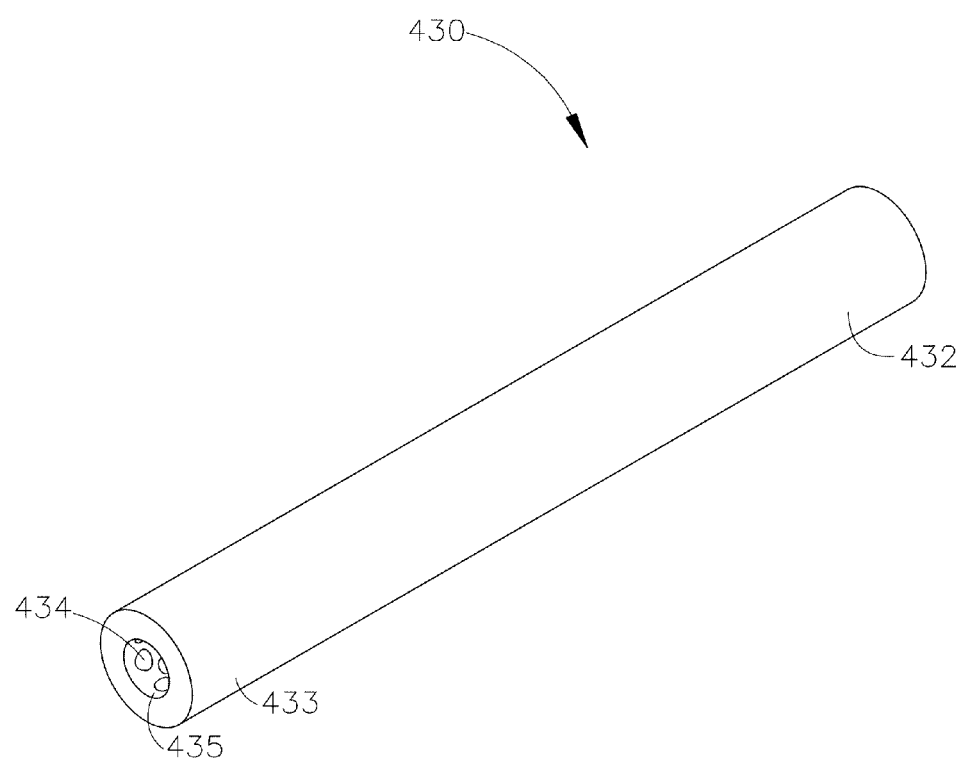
FIG. 12 is a perspective view of a still another form of a thermal insulation jacket for a heated conduit constructed in accordance with the teachings of the present disclosure.

Referring to FIG. 12, another form of a thermal insulation jacket for heated conduit and having air chambers is generally indicated by reference numeral 430. The thermal insulation jacket 430 preferably defines a tubular insulation body 432 having an outer wall 433 and an inner wall 435. As shown, the tubular insulation body 432 has a plurality of air pockets 434 formed into the inner wall 435 and arranged in a somewhat random configuration along the longitudinal direction of the tubular insulation body 432. Accordingly, the air pockets 434 reduce heat losses through the thermal insulation jacket 430.

Figure 13:
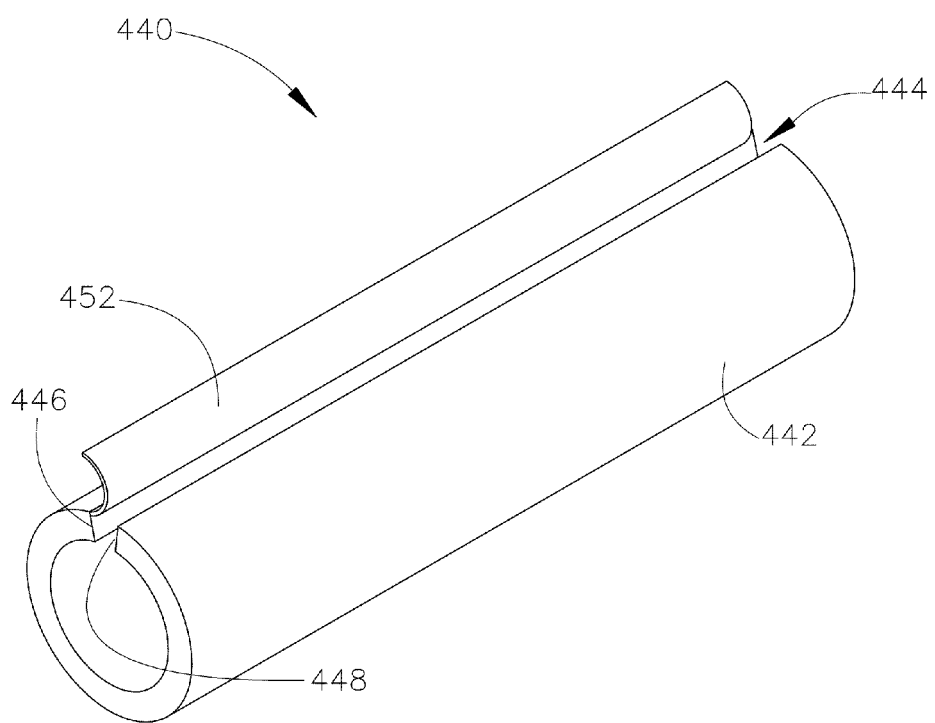

Referring to FIG. 13, still another form of a thermal insulation jacket for a heated conduit is generally indicated by reference numeral 440. The thermal insulation jacket 440 defines a tubular insulation body 442, which has a longitudinal slit 444 defined by opposing longitudinal edges 446 and 448. The opposing longitudinal edges 446 and 448 are spaced apart in a circumferential direction and are properly spaced to allow for placement around a heated conduit. More specifically, the tubular insulation body 442 is made of a flexible material, e.g., silicone rubber sheet or foam, neoprene, polyimide foam or tape, among many others, such that the longitudinal edges 446 and 448 are deflected outwardly and are then biased against the heated conduit.

As further shown, one of the longitudinal edges 446 is provided with a flap 452 for properly engaging the other one of the longitudinal edges 446 after the thermal insulation jacket 440 is placed around the heated conduit. Using the flap 452 to close the longitudinal slit 444 helps to reduce heat loss to the outside environment. Preferably, the flap 452 is also made of a thermal insulation material to provide thermal insulation. The flap 452 may be made of an adhesive tape, or provided with an adhesive coating, or alternately may be Velcro® or a flap that includes mechanical snaps, among other securing techniques, such that the flap 452 is secured to the other one of the longitudinal edges 448 and along an outer surface of the tubular insulation body 442.

In each of the thermal insulation jacket embodiments as described herein, it is preferable that the jackets are extruded. Additionally, it should be understood that any of the features, e.g., air chambers, pockets sized to the heat trace section geometry, longitudinal slit, and flap, may be provided alone or in combination with each other while remaining within the scope of the present disclosure. Moreover, multiple pockets may be provided to facilitate multiple heat trace sections 52 while not departing from the spirit and scope of the present disclosure.

Figure 14:
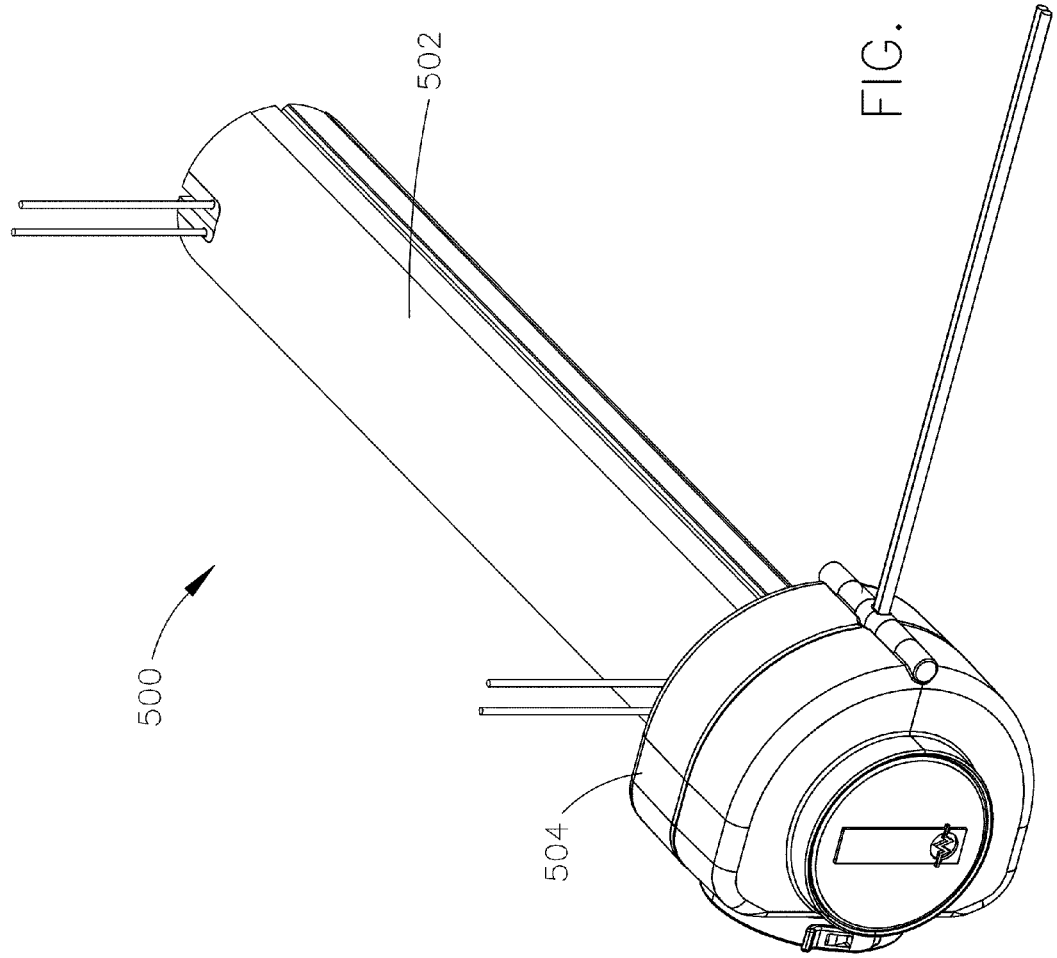
FIG. 14 is a perspective view of another embodiment of a modular heat trace assembly constructed in accordance with the teachings of the present disclosure.
Figure 15:
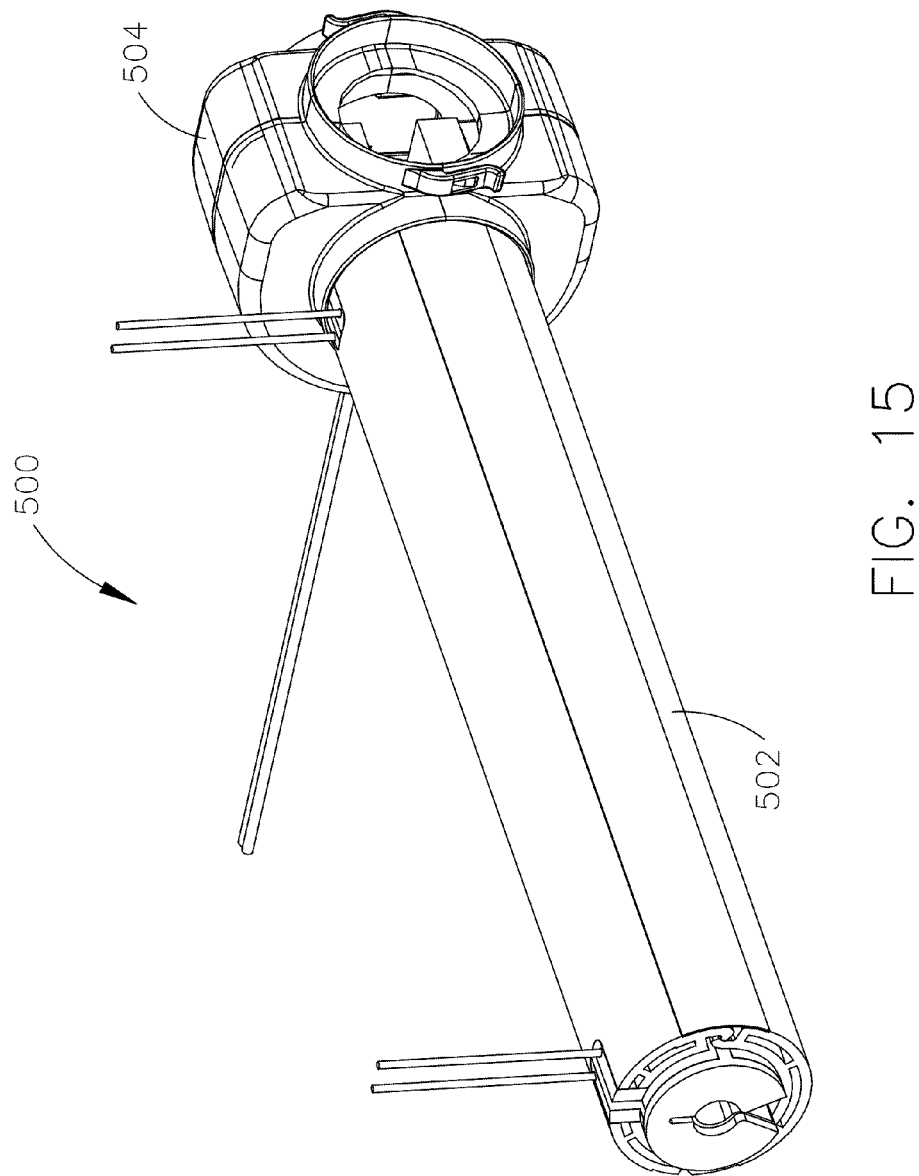
FIG. 15 is another perspective view of the modular heat trace assembly of FIG. 14 in accordance with the teachings of the present disclosure.
Figure 16:
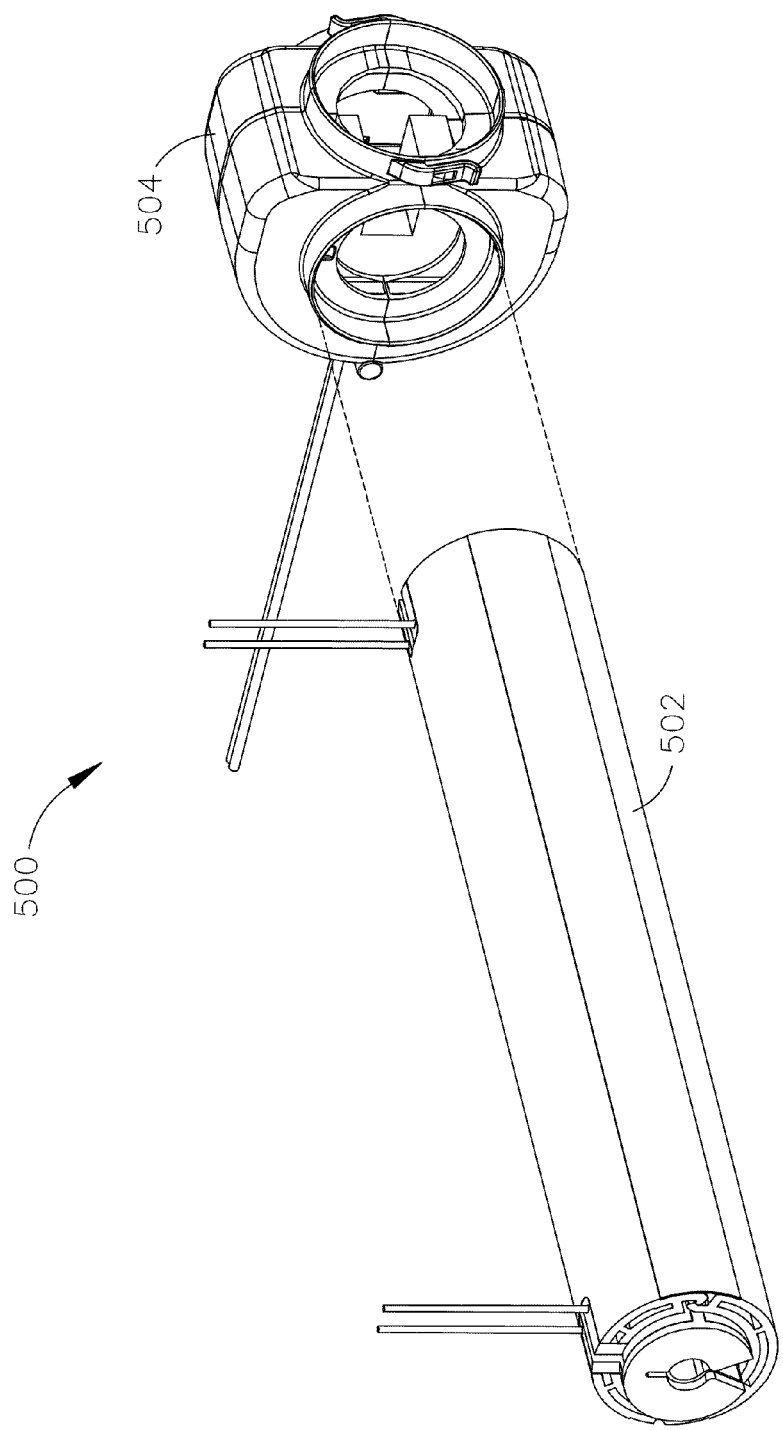
FIG. 16 is an exploded perspective view of the modular heat trace assembly of FIG. 15 in accordance with the teachings of the present disclosure.

Referring now to FIGS. 14-16, another form of a modular heater system is illustrated and generally indicated by reference numeral 500. Generally, the modular heater system 500 comprises a heat trace assembly 502 and a connector assembly 504. Only one (1) heat trace assembly 502 and one (1) connector assembly 504 are shown for purposes of clarity, and it should be understood that the modular heater system 500 can, and often does, include a plurality of either or both heat trace assemblies 502 and connector assemblies 504, depending on the end application.

The heat trace assembly 502 is adapted for contacting and heating, for example, a conduit 13 of the semiconductor processing system 10 as previously described and shown in FIGS. 1 and 2. It should be understood that the modular heater system 500 can be applied to numerous end applications, and thus the semiconductor processing system 10 as illustrated and described herein is merely exemplary. Accordingly, these end applications are hereinafter referred to as "target systems" for the modular heater system 500. The connector assembly 504 is also adapted for contacting and heating, for example, a joint, connector, or other component of the target system. Additionally, the connector assembly 504 secures adjacent heat trace assemblies 502 to each other and accommodates the joints, connectors, or other components of the target system. The connector assembly also provides both heat to the components of the target system and insulation from heat loss to the outside environment, among other functions, as described in greater detail below.

Similar to the previously described heat trace sections 52 (FIGS. 7 and 8), the heat trace sections 510 are preferably preformed in sizes corresponding to different sizes, or outside peripheries of, for example, the conduit 13. The heat trace sections 510 are preferably extruded and are also capable of being cut to length, according to a desired length for a particular section of conduit 13. Preferably, the heat trace sections 510 are provided in standard sizes and lengths for ease of repair and replacement within a conduit system such as the semiconductor processing system 10 as previously illustrated and described. Accordingly, the modular construction of the heater system according to the teachings of the present disclosure facilitates a relatively low cost heater system that is easily adapted to, for example, a conduit system.

Connector Assembly 504

Figure 17:
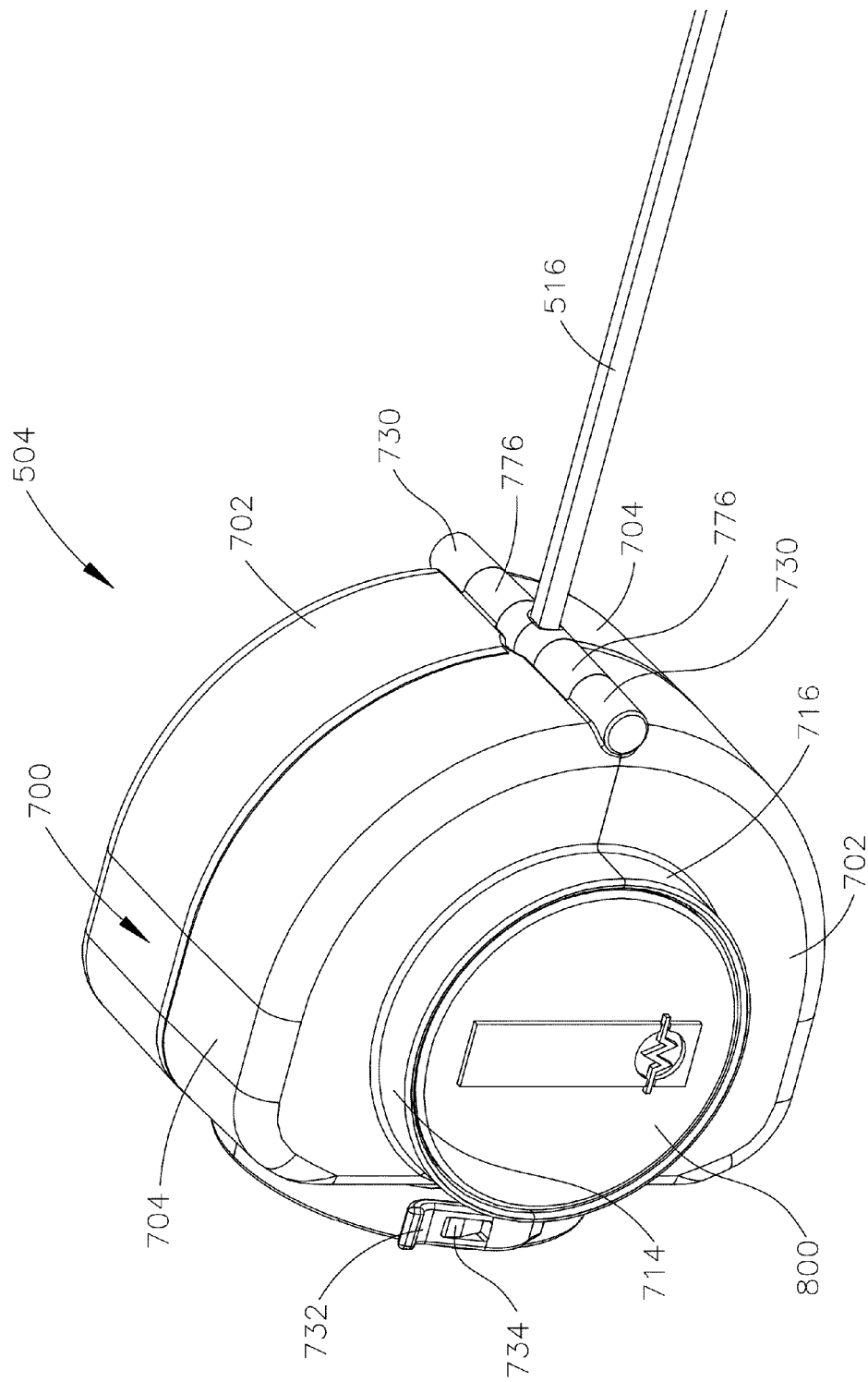
FIG. 17 is a rear perspective view of a connector assembly in accordance with the teachings of the present disclosure.
Figure 18:
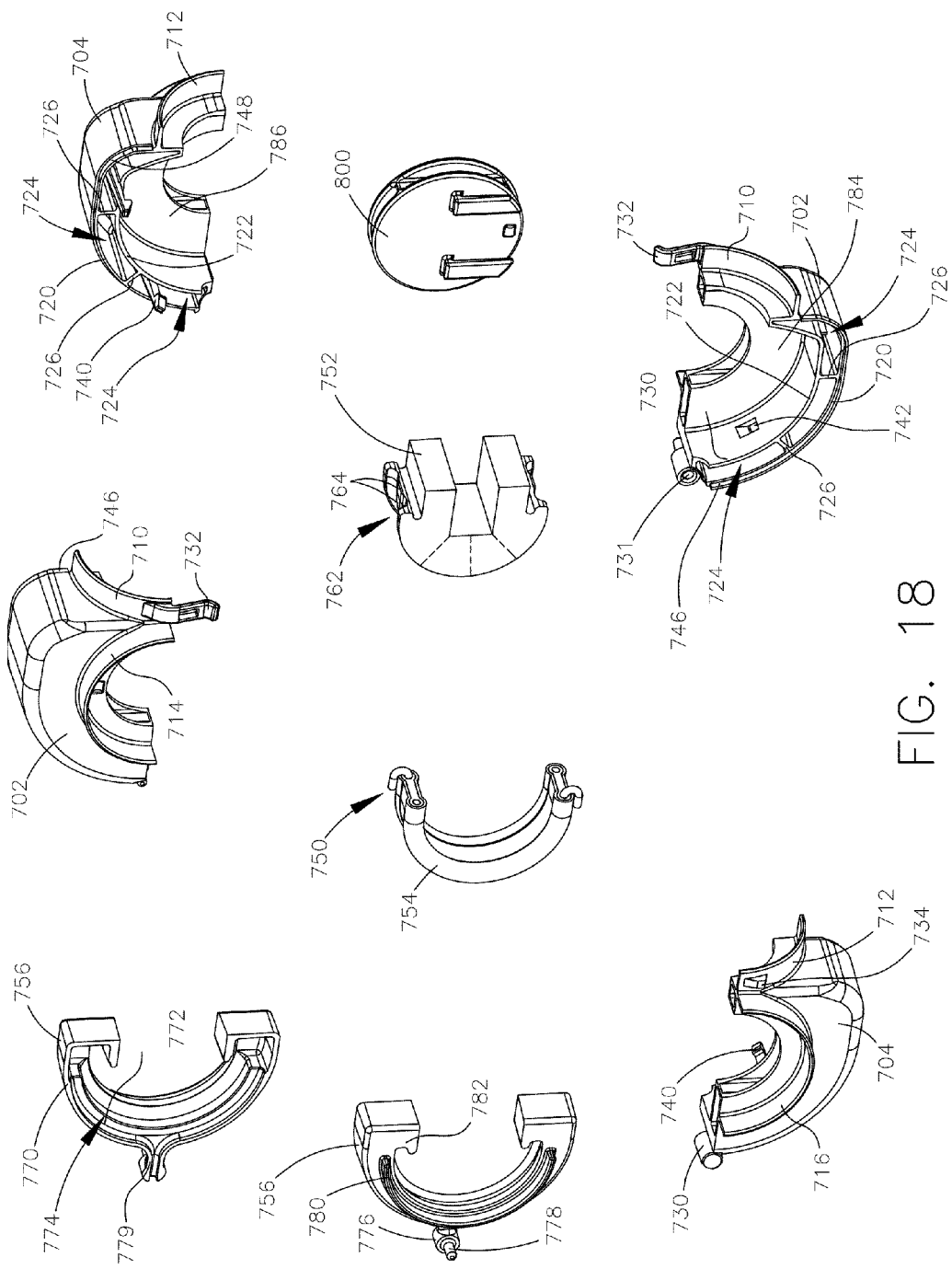
FIG. 18 is an exploded perspective view of the connector assembly in accordance with the teachings of the present disclosure.
Figure 19:
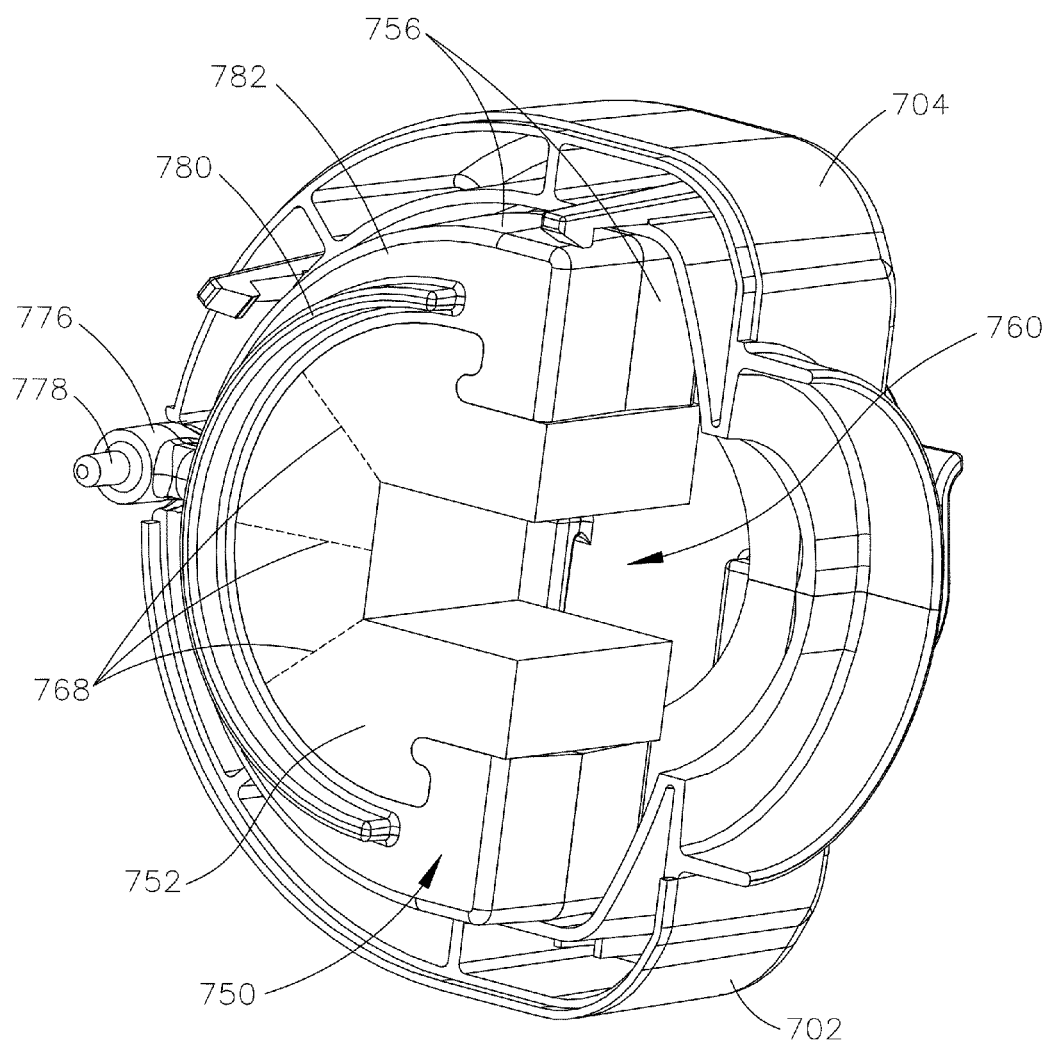
FIG. 19 is a partial perspective view of a fitting heater assembly constructed in accordance with the teachings of the present disclosure.
Figure 20:
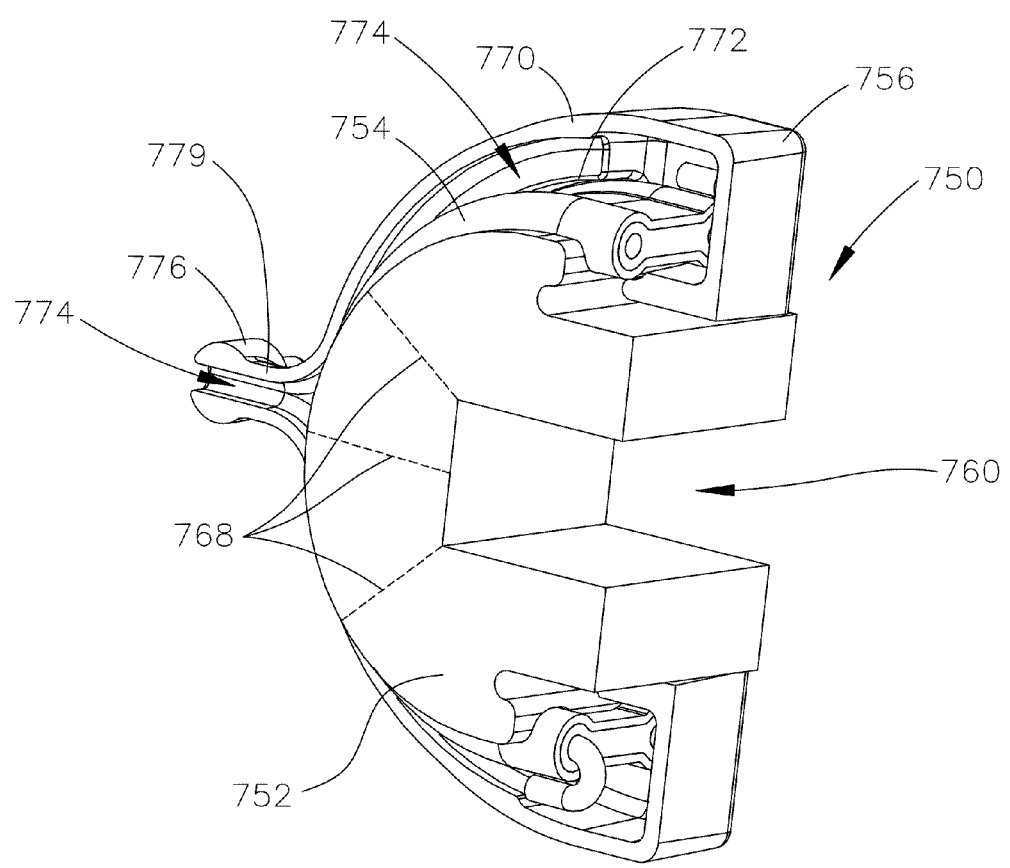
FIG. 20 is another partial perspective view of the fitting heater assembly constructed in accordance with the teachings of the present disclosure.

Referring now to FIGS. 17 and 18, the connector assembly 504 comprises a shell 700, which preferably includes a plurality of shell members 702 and 704. Disposed inside the shell 700 are additional components of the connector assembly 504, including a fitting heater assembly 750, which is best shown in FIGS. 18-20. The fitting heater assembly 750 comprises a fitting adapter 752, a heat trace section 754, and an outer casing 756 that is preferably in two (2) pieces as shown. The fitting adapter 752 defines an opening 760 that is sized to mate with an adjacent fitting or component of the target system (not shown). Accordingly, it should be understood that the size and shape of the opening 760 as illustrated and described herein is merely exemplary and should not be construed as limiting the scope of the present disclosure.

The fitting adapter 752 also defines a recessed outer periphery 762 having grooves 764, both of which are sized to accommodate the geometry of the heat trace section 754 as shown. Preferably, the fitting adapter 752 is a conductive material such as Aluminum, however, other materials may also be used while remaining within the scope of the present disclosure. Alternately, the fitting adapter 752 may include slits 768 (shown dashed) to provide for expansion of the opening 760 and thus more intimate contact with the adjacent fitting of the target system.

Figure 49:
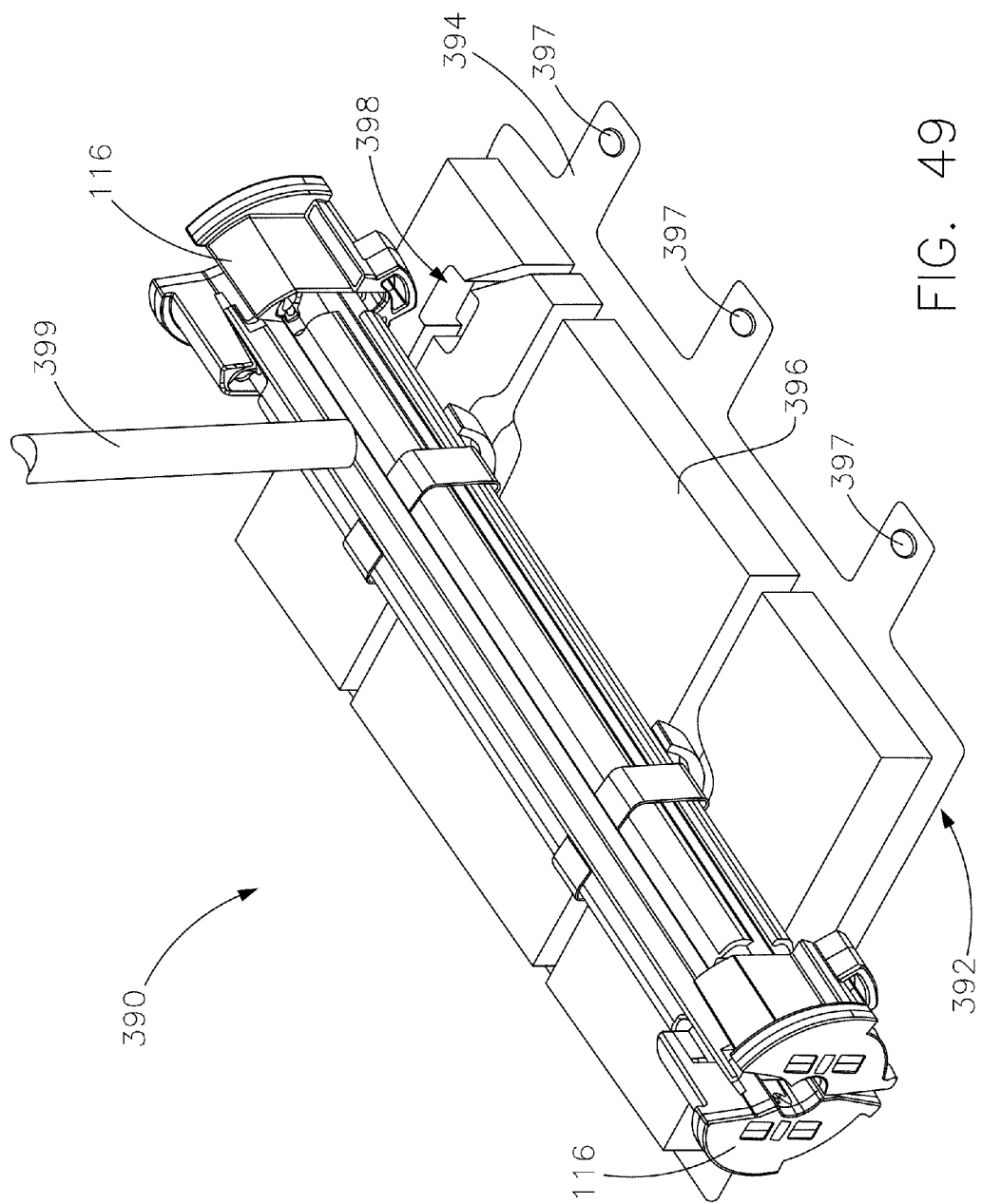
FIG. 49 is a perspective view of a heater system having a flexible cover constructed in accordance with the principles of the present disclosure.

Preferably, the outer casing 756 is provided in symmetrical, interchangeable pieces as shown. The outer casings 756 include outer walls 770 and inner walls 772 that define conduits 774 therebetween. The conduits 774 provide a passageway for the lead wires (not shown) to connect to the heat trace section 754. The outer casings 756 also include hinge elements 776 that cooperate with the hinge elements 730 of the shell members 702 and 704, which are also shown in FIG. 49. As such, the hinge elements 776 preferably include pins 778 that are adapted for placement within holes 731 (FIG. 18) of the shell member hinge elements 730. Additionally, the conduits 774 extend through the hinge elements 776 as shown to provide egress for the lead wires that connect to the heat trace section 754. Preferably, the hinge elements 776 are disposed on an extension 779 as shown, wherein the extension 779 functions as a strain relief for the lead wires.

The outer casings 756 also preferably include standoffs 780 extending from their outer faces 782 as shown. These standoffs 780 function to center, or position, the fitting heater assembly 750 properly within the shell 700.

Figure 21:
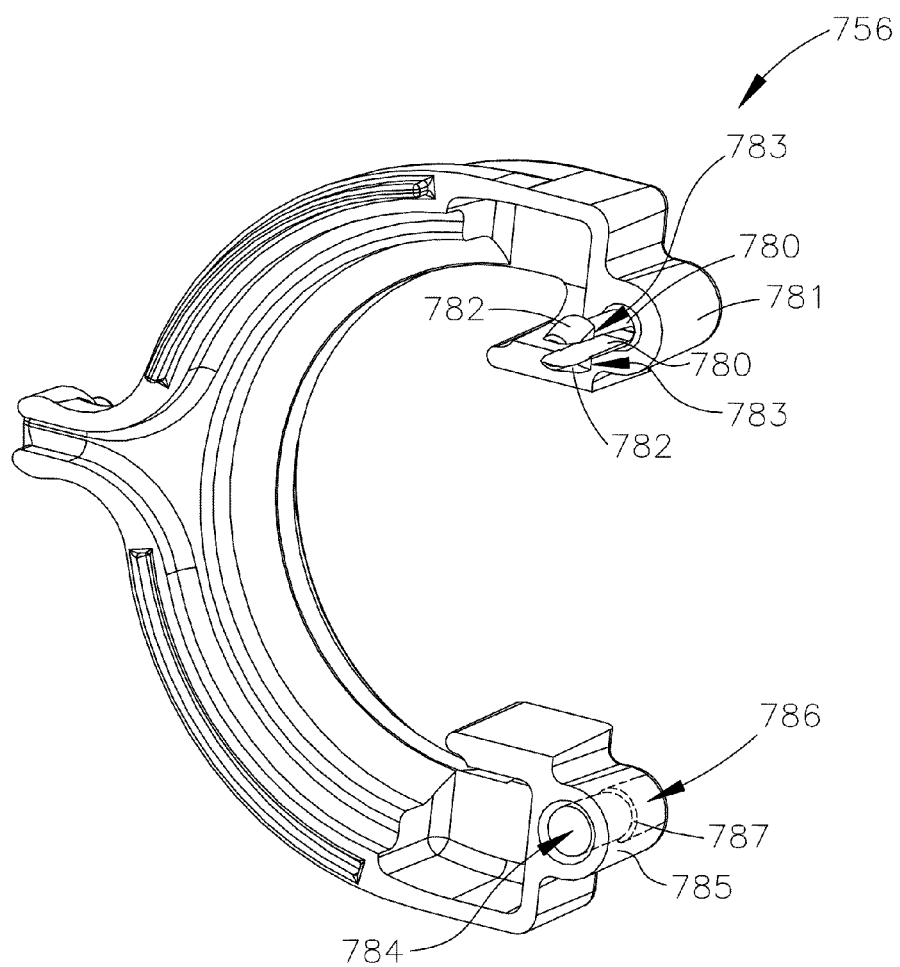
FIG. 21 is a perspective view of an alternate embodiment of an outer casing having a snap feature and constructed in accordance with the teachings of the present disclosure.
Figure 22:
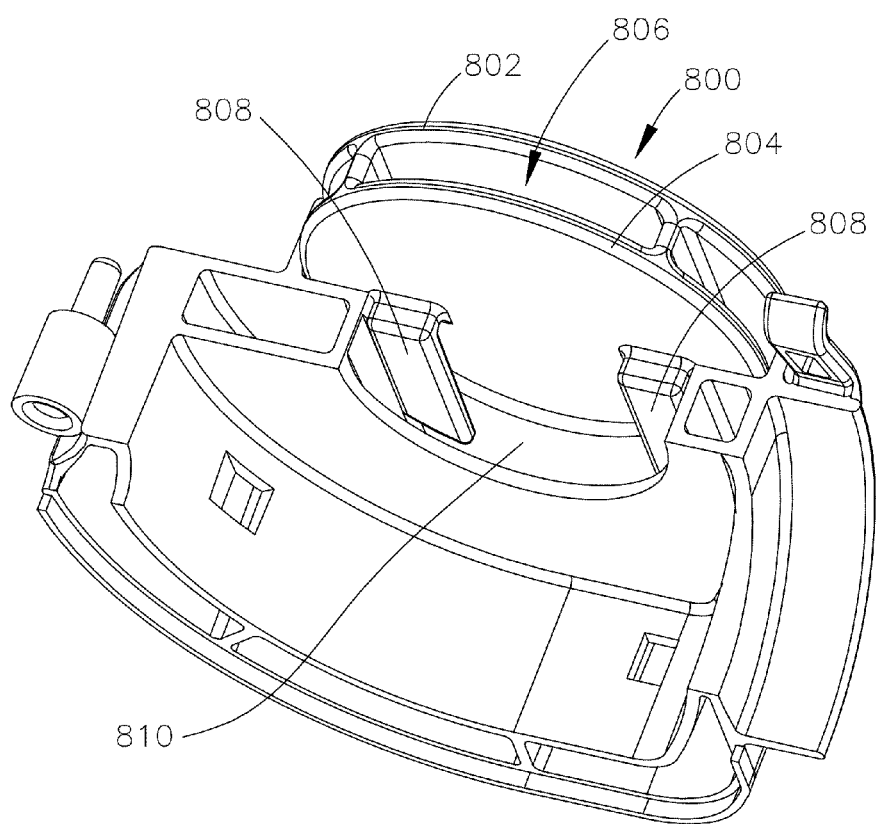
FIG. 22 is a perspective view of a cover engaged with a shell member and constructed in accordance with the teachings of the present disclosure.
Figure 23:
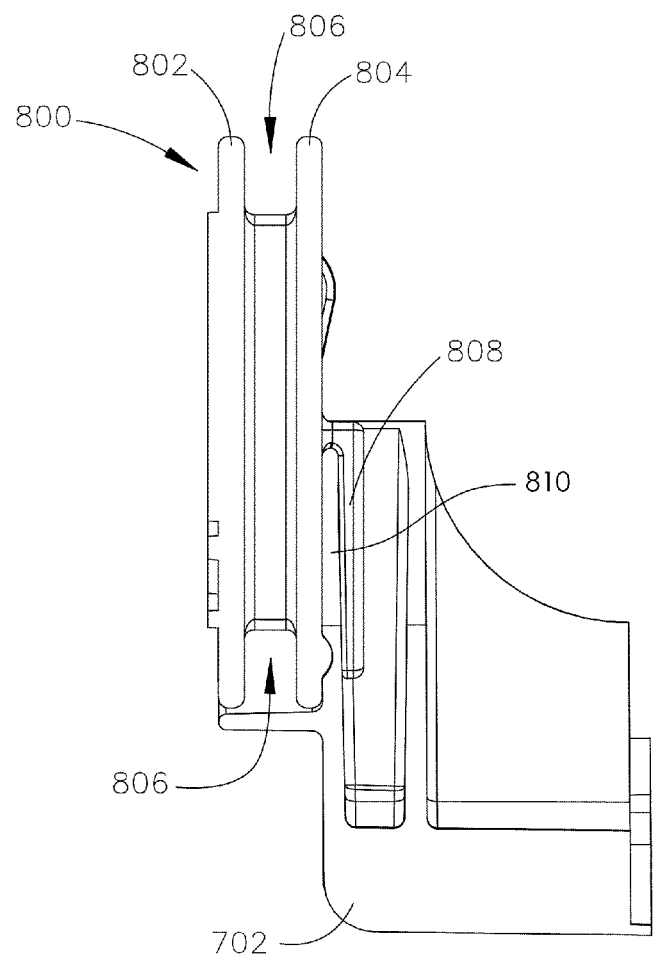
FIG. 23 is a side view of the cover engaged with the shell member in accordance with the teachings of the present disclosure.

In an alternate form of the outer casings 756, as illustrated in FIG. 21, a snap feature is employed to securely connect each of the two outer casings 756 to each other. (Only one outer casing 756 is shown for purposes of clarity). More specifically, the casing 756 comprises flexible latches 780 that extend from a boss 781, both of which are preferably integrally formed with the outer casing 756. The flexible latches 780 define tapered end portions 782 that include relatively flat transverse faces 783 as shown. As further shown, a bore 784 is formed through an opposing boss 785, which is also preferably integrally formed with the outer casing 756. A counterbore 786 (shown dashed) is also formed in the opposing boss 785, which defines an internal shoulder 787 (shown dashed). As the tapered end portions 782 engage the bore 784 of an opposing outer casing 756 (not shown), the flexible latches 780 deflect inwardly, towards each other such that the flexible latches 780 and the tapered end portions 782 can traverse the length of the bore 784. As the tapered end portions 782 enter the counterbore 786, the flexible latches 780 deflect back outwardly, and the transverse faces 783 engage the internal shoulder 787 to secure the outer casings 756 together. To separate the two outer casings 756, the flexible latches 780 are deflected inwardly through the counterbore 786 until the transverse faces 783 clear the internal shoulder 787, and the two outer casings 756 can then be pulled apart. It should be understood that this connecting device is exemplary only and thus other connecting devices for the outer casings 756 may also be employed while remaining within the scope of the present disclosure.

It should be understood that the exemplary connector assembly 504 as illustrated and described herein is configured for an elbow-type connection within the target system and that the geometry and features of the connector assembly 504 and its various components will vary depending on the connection employed within the target system. For example, if the connector assembly 540 were adapted for placement over a T-junction or a cross-type junction, or even a separate component such as a pump, by way of example, the size and shape of the connector assembly 540 components would be adjusted accordingly. Therefore, the specific design of the connector assembly 540 as illustrated and described herein should not be construed as limiting the scope of the present disclosure.

In another form of the present disclosure, the heat trace assemblies 502 are "matched" with the connector assemblies 504 to achieve even temperatures across their interfaces. More specifically, different power densities may be required at the connector assemblies 504 versus the heat traces assemblies 502, and as such, different power densities are contemplated for each.

In yet another form, a reflective surface coating may be provided along the interior surfaces 513 of the insulation jacket 512 and/or the shell members 702 and 704 to reduce the power required and also to reduce the exterior surface temperatures of the modular heater system 500 components. Such a reflective surface coating preferably has low emissivity and may include, by way of example, an Aluminum foil or other low emissivity material applied by a vapor deposition process, by way of example. Similarly, a high emissivity material may be applied between the conduit 13 and the dielectric or insulator material 26, or cover, that surrounds the semiconductive polymer material 24, or conductive core, of the heat trace section 510. (See FIGS. 3 and 4 for basic construction of heat trace section and its terminology). As such, the high emissivity material would improve heat transfer between the heat trace section 510 and the conduit 13.

Figure 24:
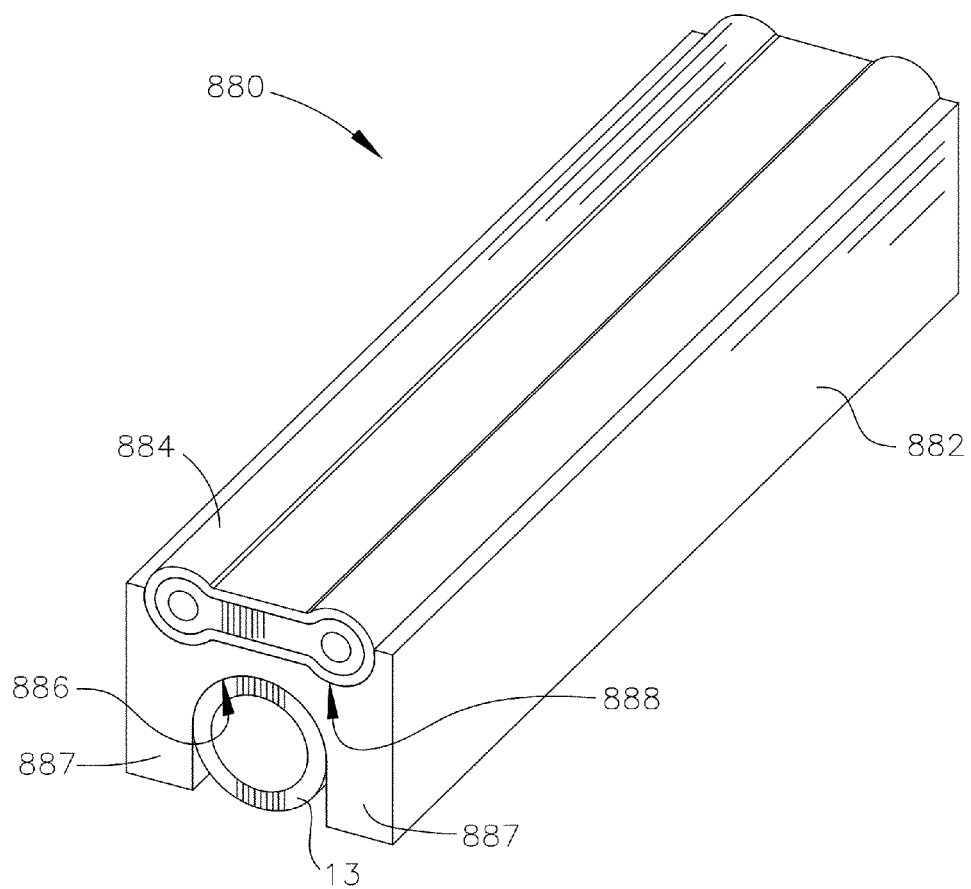
FIG. 24 is a perspective view of another form of a heat trace assembly utilizing a carrier and constructed in accordance with the teachings of the present disclosure.

Referring now to FIGS. 24 and 25, another form of a heat trace assembly is illustrated and generally indicated by reference numeral 880. The heat trace assembly 880 comprises a carrier 882 that is adapted for placement around the conduit 13, and a heat trace section 884 secured to the carrier 882. In this embodiment, a standard/conventional heat trace section 884 can be employed without forming the heat trace section 884 to the shape of the conduit 13 as previously illustrated and described. Accordingly, the carrier 882 comprises an interior surface 886 that defines a shape complementary to the conduit 13, along with extensions 887 that extend around at least one half of the periphery of the conduit 13 as shown. The carrier 882 further comprises a recessed upper surface 888 that is sized to receive the heat trace section 884. The heat trace section 884 is then secured within this recessed upper surface 888 by any of a variety of means. For example, the heat trace section 884 may be press-fit or snapped into the recessed upper surface 888, the carrier 882 may include a feature to secure the heat trace section 884, an additional component (e.g. retaining clip) may be used to secure the heat trace section 884 to the carrier 882, or an adhesive may be used to secure the heat trace section 888 within the carrier 882, among other fastening or securing methods. Preferably, the carrier 882 is made of a material such as aluminum, brass, copper, or a conductive polymer so that the heat generated from the heat trace section 884 can be efficiently transferred to the conduit 13. It should be understood that the insulation jackets as previously illustrated and described herein may also be employed with this heat trace assembly 880 while remaining within the scope of the present disclosure, even though such insulation jackets are not explicitly illustrated and described with this embodiment.

Figure 26A:
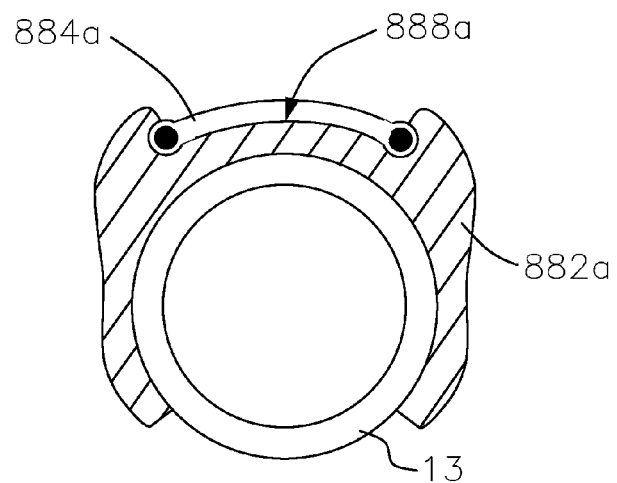
FIG. 26a is an end view of an alternate form of a carrier constructed in accordance with the teachings of the present disclosure.
Figure 26B:
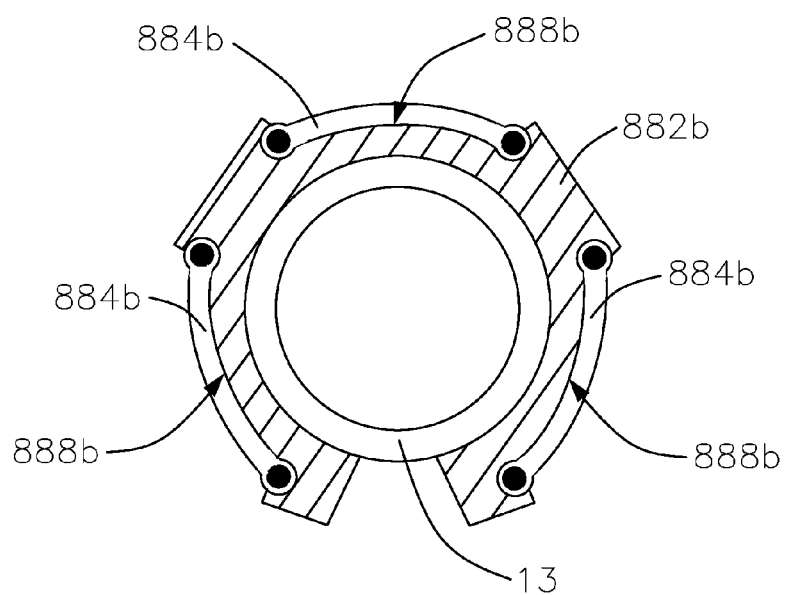
FIG. 26b is an end view of another alternate form of a carrier constructed in accordance with the teachings of the present disclosure.

Referring to FIGS. 26a and 26b, alternate forms of the carrier are illustrated and generally indicated by reference numerals 882a and 882b, respectively. As shown in FIG. 62a, the carrier 882a defines a recessed upper surface 888a that defines a curved geometry to accommodate a corresponding curved heat trace section 884a. The curved geometry thus provides for improved heat transfer from the heat trace section 884a to the conduit 13 since the heat trace section 884a generally follows the contour of the underlying conduit 13. As shown in FIG. 62b, the carrier 882b defines multiple recessed upper surfaces 888b, which may be curved as shown or relatively straight or flat as previously illustrated in FIGS. 60 and 61. As such, the carrier 882b is preferably employed in applications where the conduit 13 has a relatively large size and requires multiple heat trace sections 884b to sufficiently surround the conduit 13.

In one form, the carrier 882 is preferably an aluminum extrusion, however, other materials that sufficiently transfer heat from the heat trace section 884 to the conduit 13 may also be employed while remaining within the scope of the present disclosure. For example, the carrier 882 may alternately be a polymer material. Additionally, alternate manufacturing methods other than extrusion, e.g., machining, may also be employed while remaining within the scope of the present disclosure.

In other forms of the present disclosure, various "indication" means are contemplated, wherein the state or condition of the heater system is indicated and can be monitored from the outside environment. For example, light emitting diodes (LEDs) may be placed along the heat trace assemblies at strategic locations to indicate whether or not the system is operational. The LEDs may be placed within individual sections of the heat trace assemblies or alternately in various electrical connections within the system. As another example, thermochromic coatings may be applied anywhere along exterior surfaces of the system, e.g., heat trace assemblies, connector assemblies, to indicate the temperature of the system at a certain location. Alternately, thermochromic additives may be employed within certain resin systems for use within, by way of example, the insulating jackets. Moreover, discrete temperature sensors may be employed within the system for temperature indications at desired locations, along with using the temperature sensors for temperature control. It should be understood that these various "indication" means are contemplated to be within the scope of the present disclosure.

Figure 27:
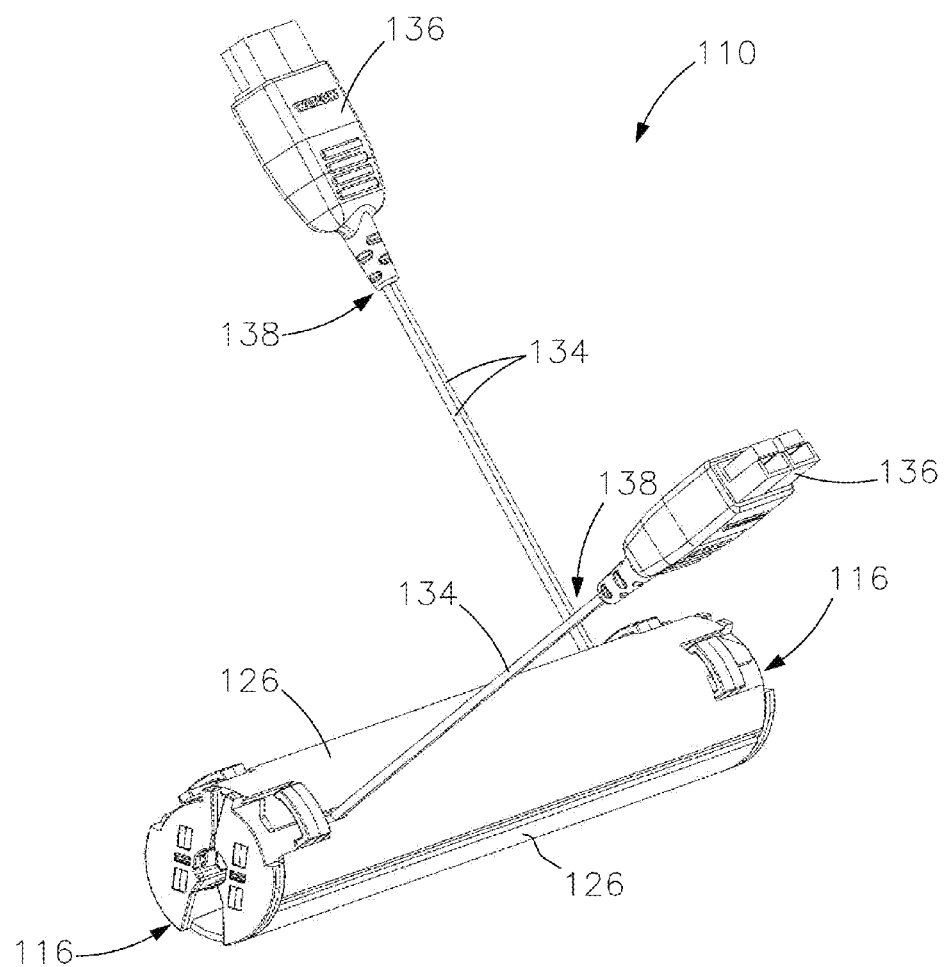
FIG. 27 is a perspective view of a heater system constructed in accordance with the principles of the present disclosure.
Figure 28:
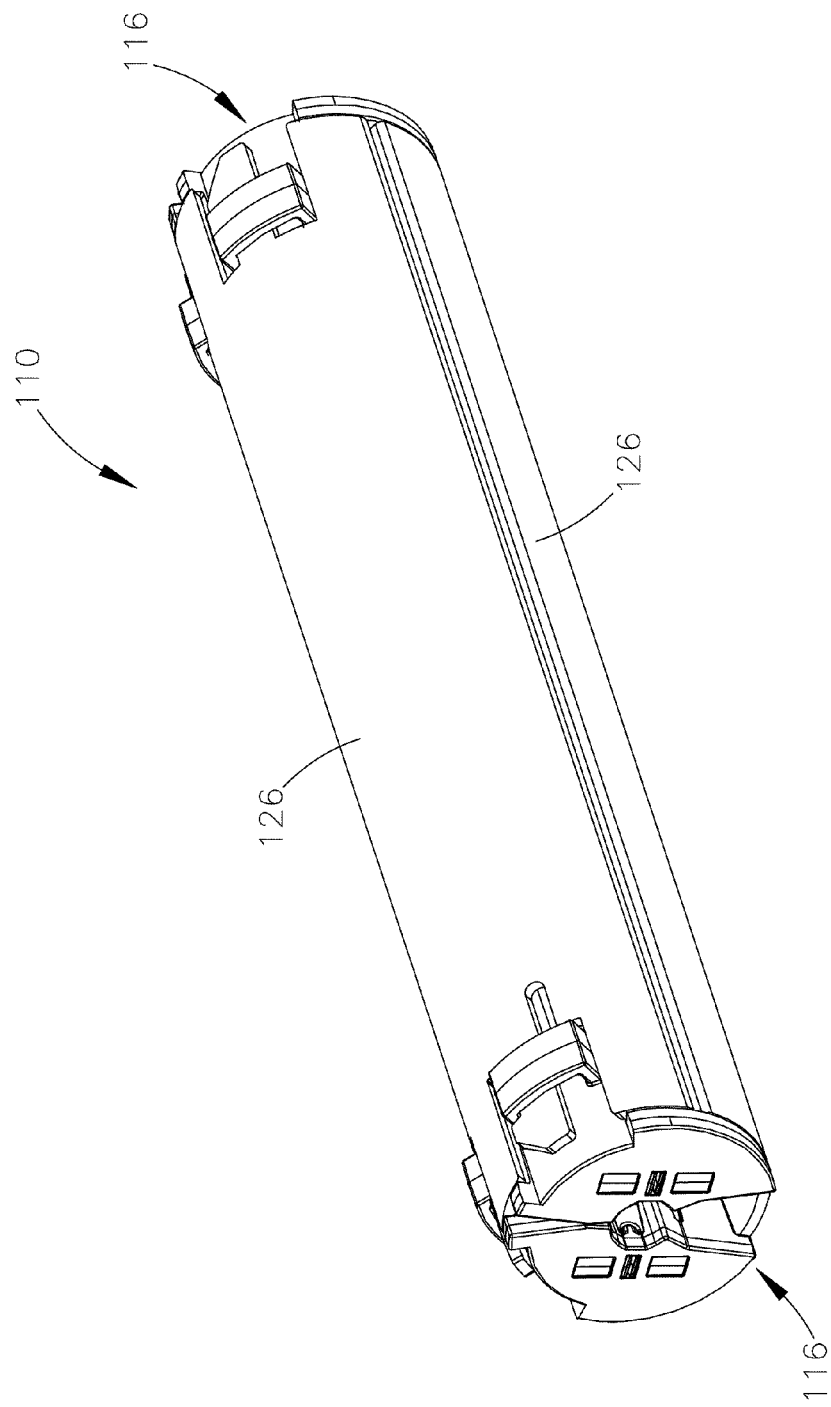
FIG. 28 is an enlarged perspective view of a heater system constructed in accordance with the principles of the present disclosure.
Figure 29:
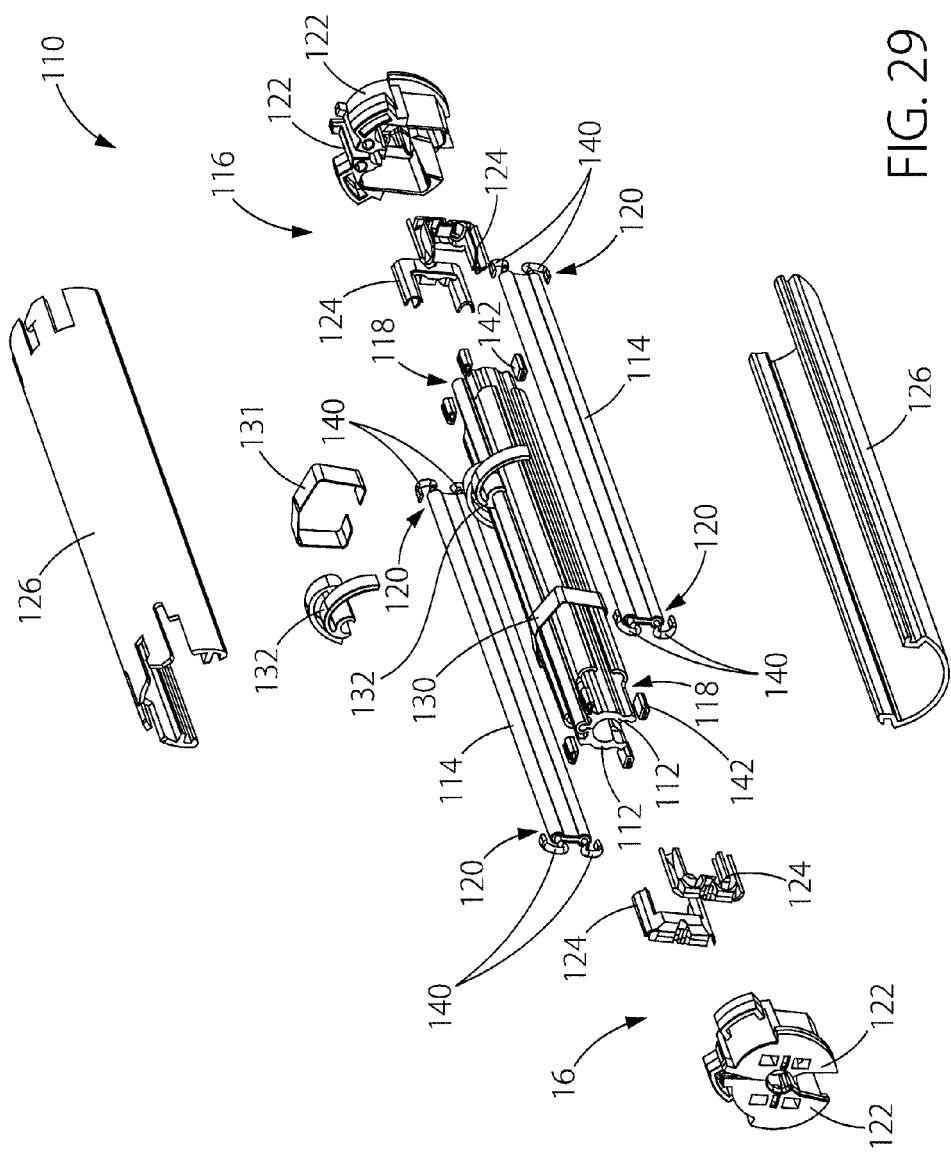
FIG. 29 is an exploded perspective view of the heater system constructed in accordance with the principles of the present disclosure.

Referring to FIGS. 27-29, a heater system in accordance with the principles of the present disclosure is illustrated and generally indicated by reference numeral 110. Generally, the heater system 110 is designed for use in heating components in semiconductor processing systems such as gaslines and pumplines, as described in copending U.S. application Ser. No. 11/520,130, titled "Modular Heater Systems," which is commonly assigned with the present application and the contents of which are incorporated herein by reference in their entirety. It should be understood, however, that the heater system 110 as set forth herein, including its various forms, is not limited to such an application and can be employed in any application to which a target is to be heated, and thus the application to semiconductor processing systems should not be construed as limiting the scope of the present disclosure.

As shown more clearly in FIG. 29, the heater system 110 comprises a plurality of carrier members 112 and a corresponding plurality of resistive heating elements 114. The resistive heating elements 114 in this form of the present disclosure are heat trace sections, which are disposed within the carrier members 112 as shown. Although two carrier members 112 and two corresponding resistive heating elements 114 are illustrated, it should be understood that any number of carrier members 112 and resistive heating elements 114 may be employed while remaining within the scope of the present disclosure. End fittings 116 are disposed proximate end portions 118 of the carrier members 112 and end portions 120 of the resistive heating elements 114. In one form, the end fittings 116 comprise external shells 122 and internal shields 124, which are described in greater detail below.

A two-piece cover 126 is disposed around the carrier members 112 and the resistive heating elements 114, and the cover 126 is secured to the end fittings 116. Although the cover 126 is illustrated as being two pieces, the cover 126 may alternately be a single piece or multiple pieces, or take on the configurations as illustrated and described in copending U.S. application Ser. No. 11/520,130, titled "Modular Heater Systems" while remaining within the scope of the present disclosure. The cover 126 generally functions to retain the heat generated by the resistive heating elements 114 within the heater system 110 so that more heat is directed to the target (not shown) and heat losses to the outside environment are reduced during operation.

The heater system 110 also comprises retaining members 130, which are disposed around at least a portion of the carrier members 112 to clasp the carrier members 112 around the target, which is further illustrated and described in greater detail below. Additionally, a standoff member 132 is disposed along the heater system 110 between the cover 126 and the target to provide a desired positioning between the resistive heating elements 114 and the cover 126 as described in greater detail below.

As further shown, the resistive heating elements 114 are electrically connected to a power source (not shown) through lead wires 134 as shown in FIG. 27, which in one form have connectors 136 disposed at their end portions 138 for ease of installation and removal of the heater system 110. As such, and with reference back to FIG. 29, the resistive heating elements 114 include lead extensions 140 and crimps 142 for electrical connection to the lead wires 134.

Referring now to FIGS. 30-33, the carrier members 112 and resistive heating elements 114 are now illustrated and described in greater detail. As shown, each carrier member 112 defines an inner periphery surface 140 and an outer receiving portion 142. The inner periphery surfaces 140 of the carrier members 112 are adapted for close proximity with a heating target 12 (FIG. 33) such that the heat being generated from the resistive heating elements 114 is efficiently transferred to the heating target 12, including through radiation. As such, in this form, the inner periphery surfaces 140 define a cylindrical configuration to match the shape of the heating target 12, which is a conduit in one exemplary application of the heater system 110. It should be understood, however, that any number of shapes and configurations of the inner periphery surfaces 140 may be employed to accommodate a variety of heating targets while remaining within the scope of the present disclosure.

Figure 30:
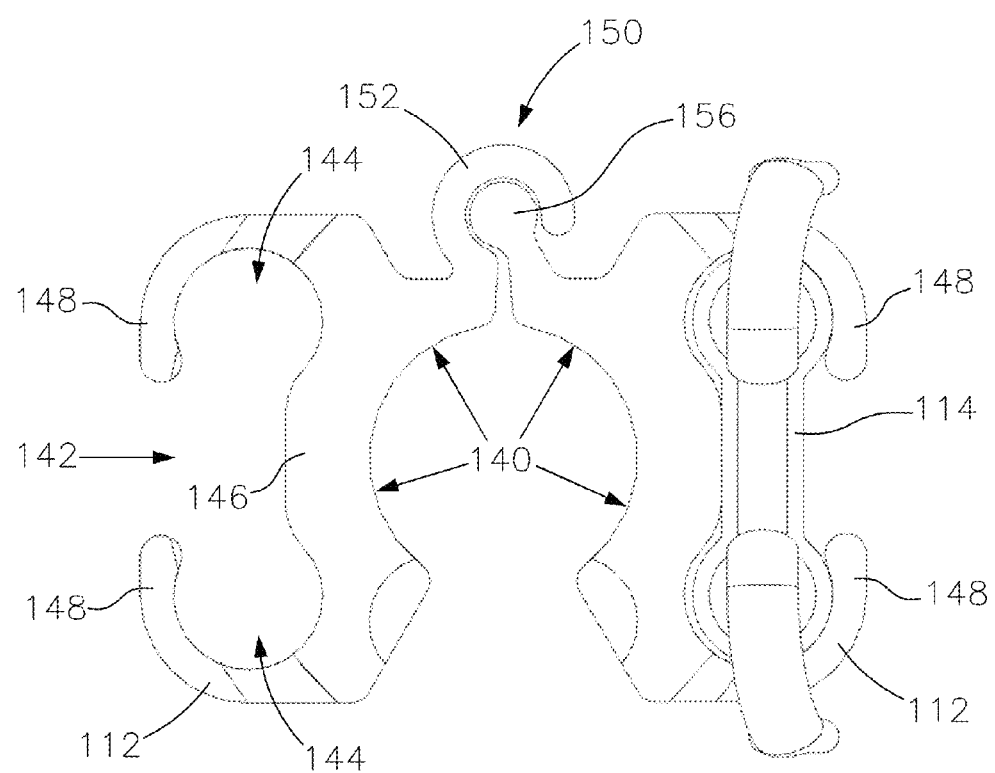
FIG. 30 is an end view of hinged carrier members and a heat trace section constructed in accordance with the principles of the present disclosure.
Figure 31:
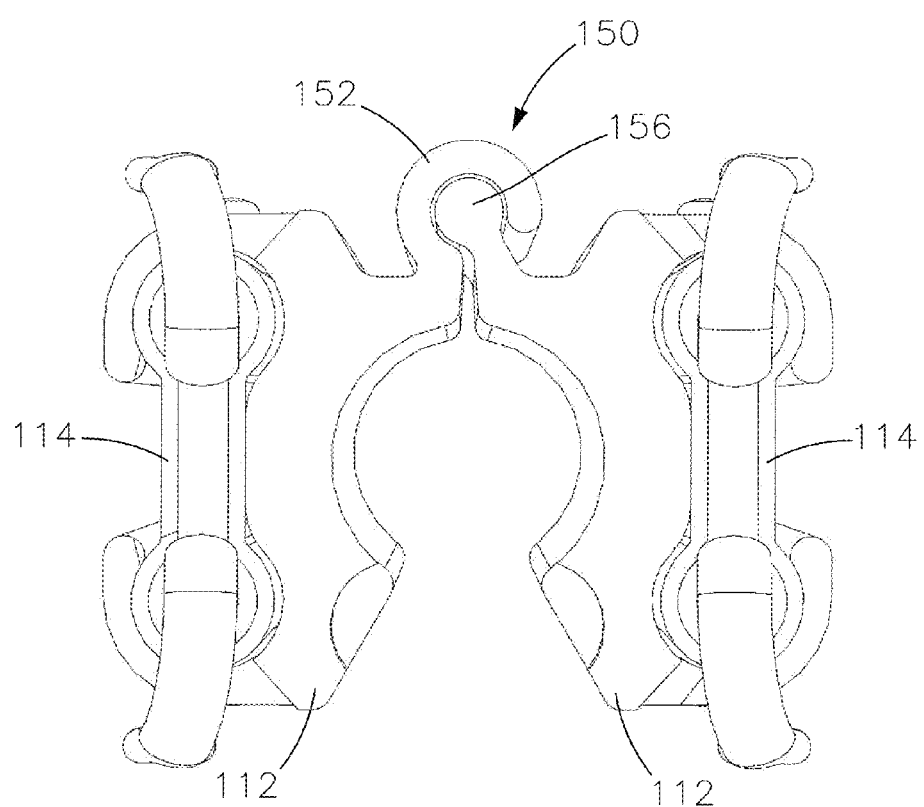
FIG. 31 is an end view of hinged carrier members and heat trace sections constructed in accordance with the principles of the present disclosure.
Figure 32:
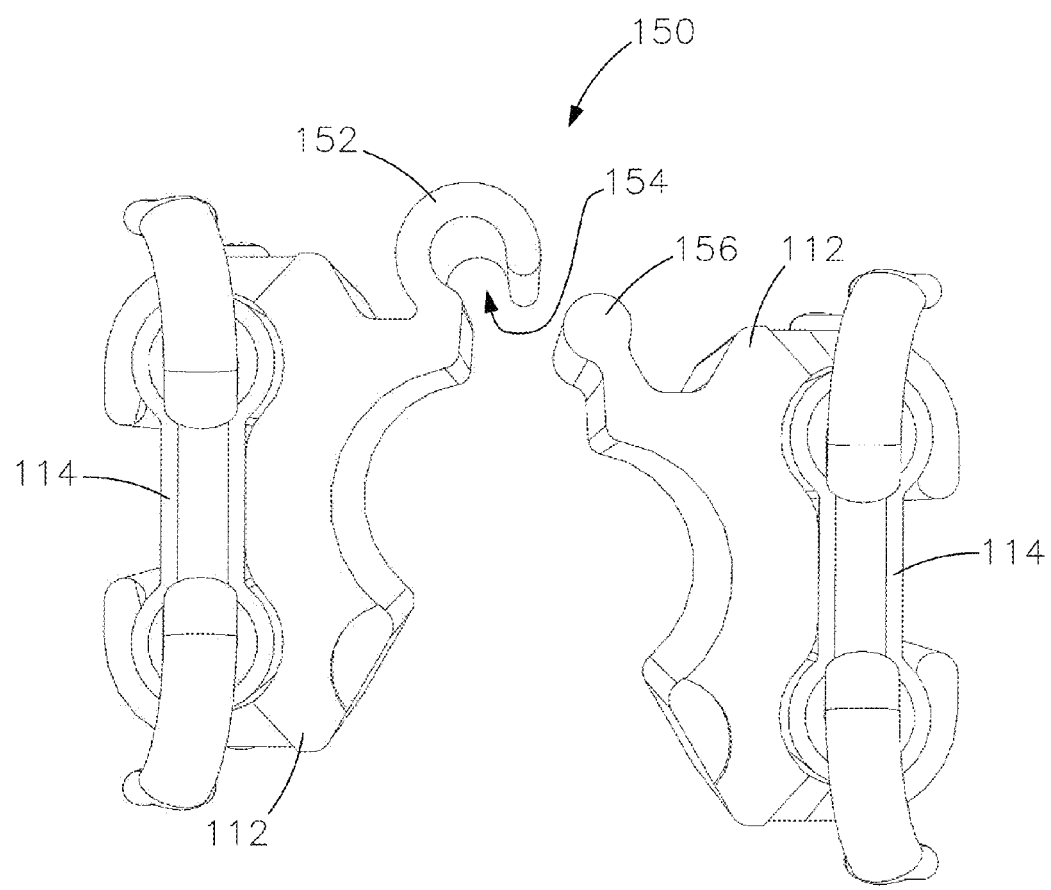
FIG. 32 is an exploded end view of hinged carrier members and heat trace sections constructed in accordance with the principles of the present disclosure.
Figure 33:
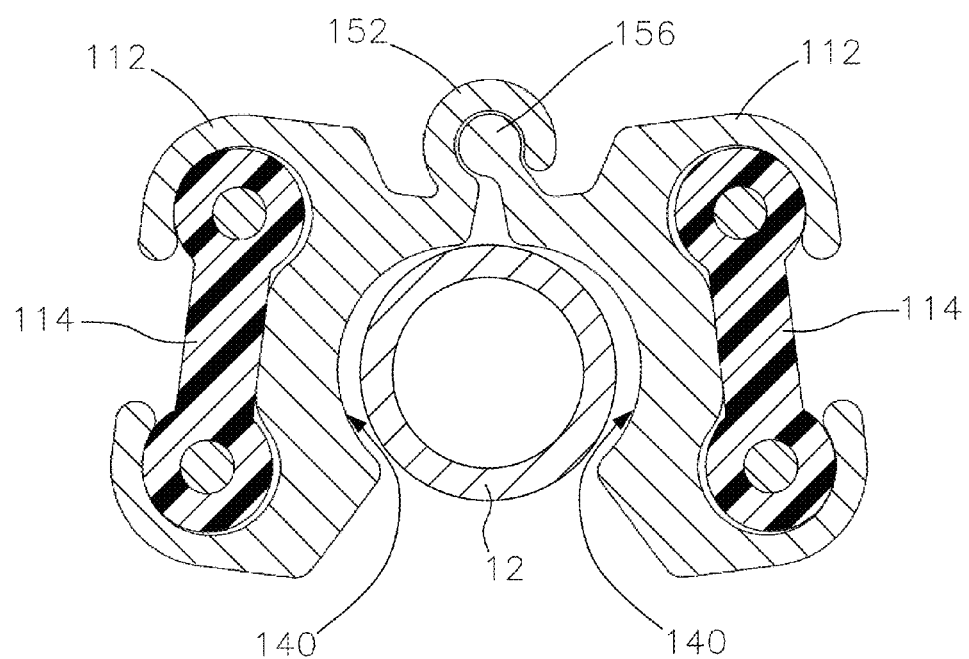
FIG. 33 is a cross-sectional view of hinged carrier members and heat trace sections rotated relative to each other around a target in accordance with the principles of the present disclosure.
Figure 34:
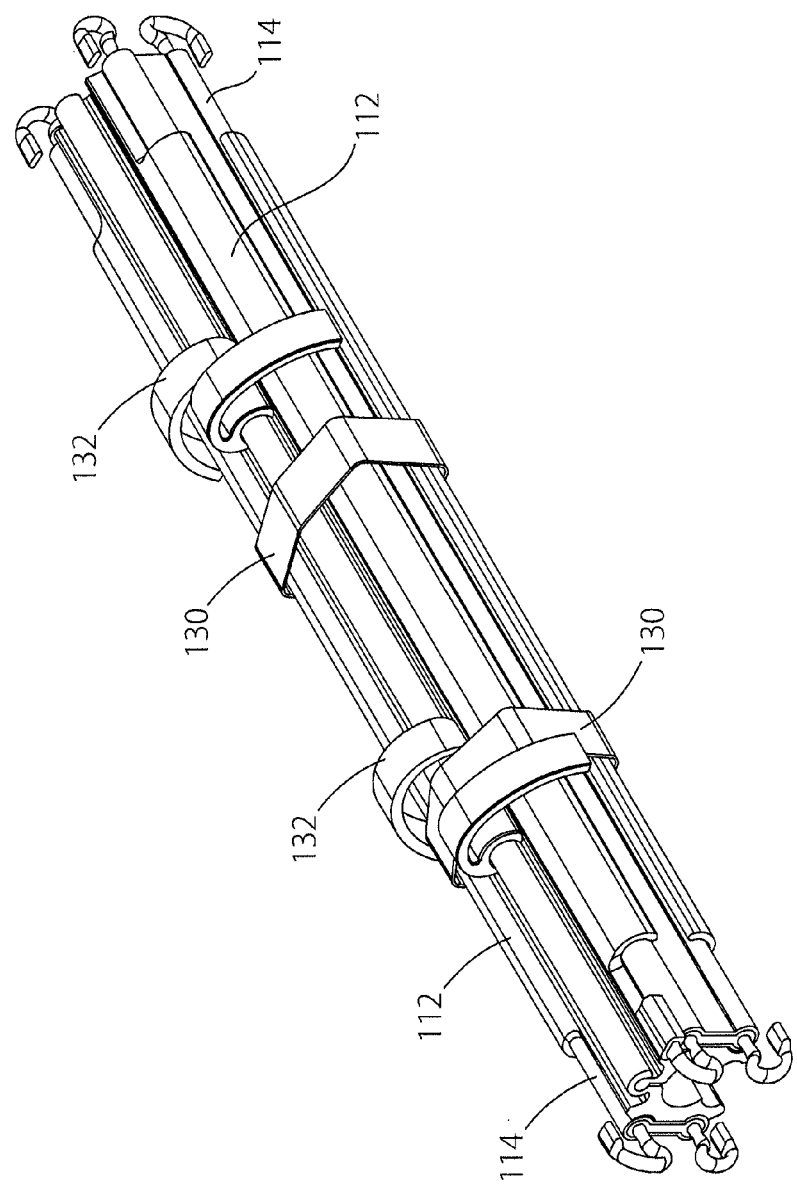
FIG. 34 is a perspective view of various internal components of the heater system constructed in accordance with the principles of the present disclosure.
Figure 35:
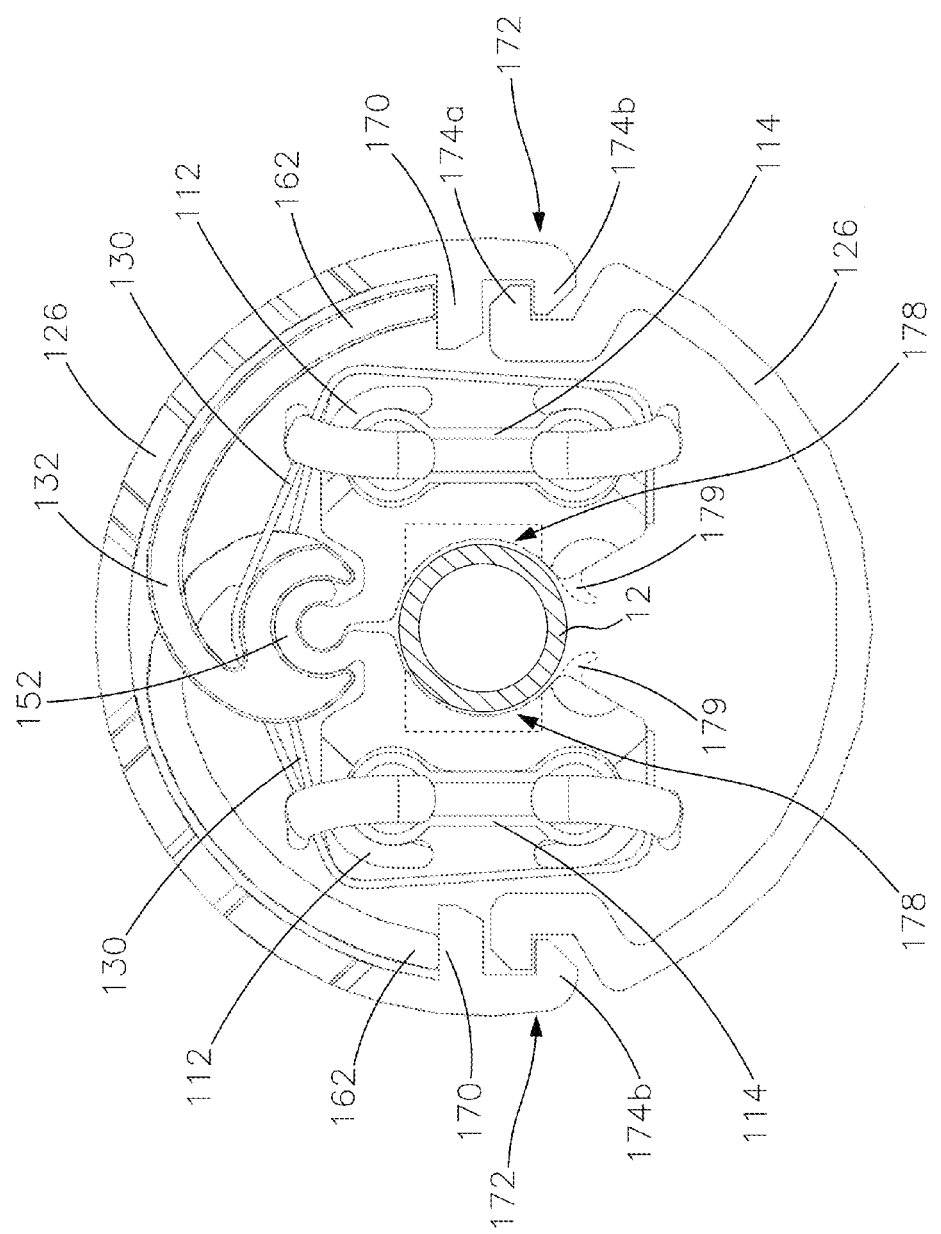
FIG. 35 is an end view of the heater system illustrating a cover, a standoff, and retaining members constructed in accordance with the principles of the present disclosure.

The resistive heating elements 114 are disposed within the outer receiving portions 142, and the outer receiving portions 142 are preferably configured to conform to the shape of the resistive heating elements 114, which in this form are heat traces sections, as shown. As such, the outer receiving portions 142 define enlarged end portions 144, an intermediate support 146, and outer retaining walls 148, which retain the resistive heating elements 114 within the carrier members 112. Additionally, the resistive heating elements 114 are conformable to the shape defined by the outer receiving portions 142 of the carrier members 112. The resistive heating elements 114 may be pre-formed to the shape of the outer receiving portions 142 prior to installation, or alternatively, the resistive heating elements 114 may be installed into the carrier members 112 and then the overall assembly (of the carrier member 112 and resistive heating element 114) formed to the shape of the heating target 12. Additionally, the heater system 110 may be provided with only one resistive heating element 114 as shown in FIG. 30, i.e. with an "empty" carrier member 112, or each of the carrier members 112 having a corresponding resistive heating element 114 as shown in FIG. 31. It should also be understood that more than two (2) sets of carrier members 112 and resistive heating elements 114 may be employed while remaining with the scope of the present disclosure. For example, three (3) sets of carrier members 112 and resistive heating elements 114 may be disposed around the target 12 while remaining within the scope of the present disclosure.

As further shown, the carrier members 112 define connecting portions 150, which in this form are hinge elements such that the carrier members 112 are hinged carrier members 112. More specifically, and with reference to FIGS. 32 and 33, one of the carrier members 112 defines a longitudinal protrusion 152 having an internal channel 154, and the adjacent carrier member 112 defines a longitudinal rib 156. The longitudinal rib 156 is disposed within the channel 154 as shown to provide a rotatable connection between the carrier members 112 in this particular embodiment. Accordingly, each set of carrier members 112 and resistive heating elements 114 can be moved relative to one another so that the heater system 112 can be more easily installed onto and removed from a heating target. Additionally, the sets of carrier members 112 and resistive heating elements 114 are capable of being disposed in closer proximity to the heating target with the relative movement for more efficient heat transfer. It should be understood that the hinged carrier members 112 are merely exemplary and that other connecting portions 150 that are adapted to be secured to at least one of an adjacent carrier member 112 and a heating target may be employed while remaining within the scope of the present disclosure. Additional exemplary embodiments of such connecting portions 150 are illustrated and described in greater detail below.

Additionally, the carrier members 112 may be provided with internal recesses 178 (shown dashed) in order to accommodate a fitting or other adjacent component that may be disposed along the target 12. The recesses 178 may be provided in any shape or size that corresponds with the shape of the fitting or adjacent component, and thus a single carrier member 112 can extend along a heating target 12 and its components without using separate, individual carrier members 112 or other specially designed members to accommodate the adjacent components or fittings. The recesses 178 may also be employed to accommodate temperature sensors or other discrete indication means incorporated within the heater system 110, such as those disclosed in copending U.S. application Ser. No. 11/520,130, titled "Modular Heater Systems," which has been incorporated herein by reference in its entirety.

Figure 36:
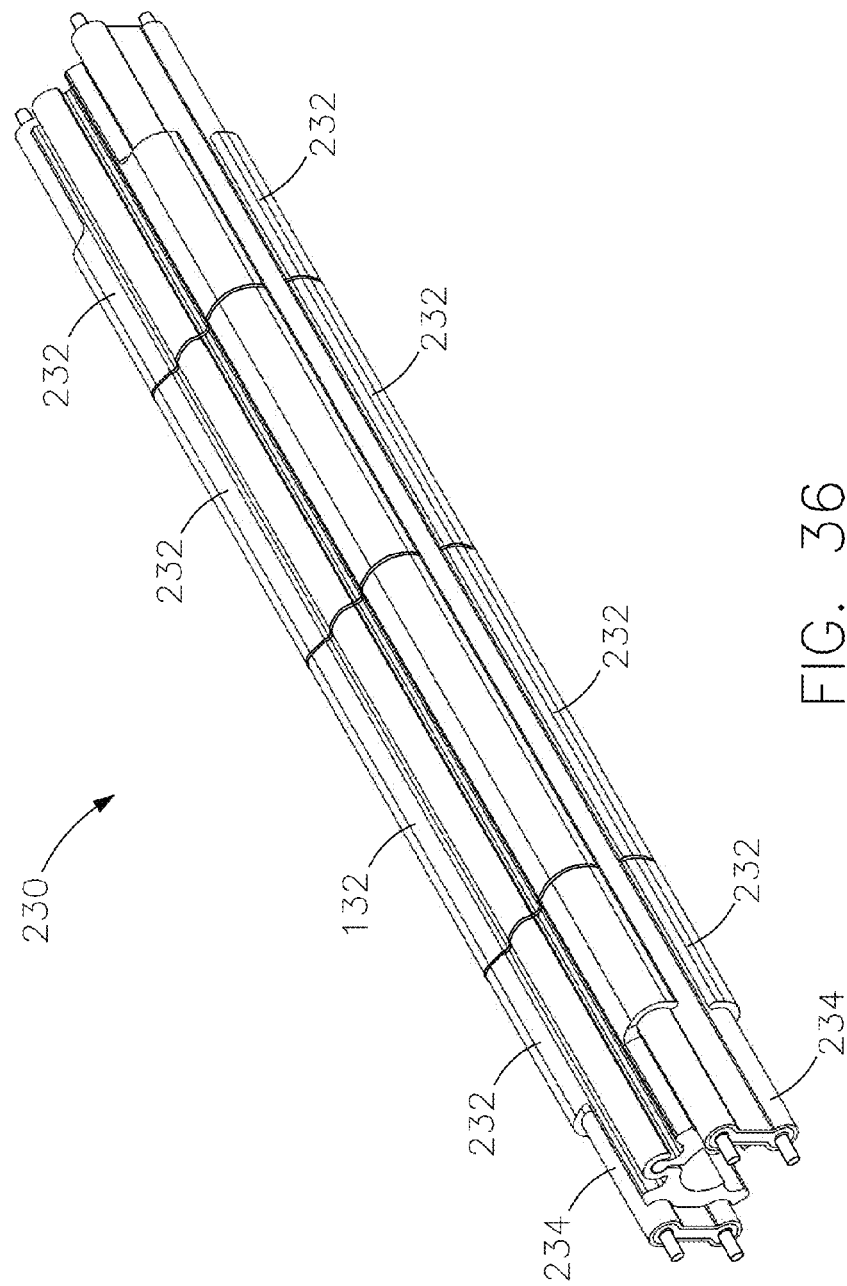
FIG. 36 is a perspective view illustrating multiple carrier members and a resistive heating element constructed in accordance with the principles of the present disclosure.

Referring to FIG. 36, yet another form of a heater system is illustrated and generally indicated by reference numeral 230. As shown, the heater system 230 includes a plurality of carrier members 232 extending along the length of individual resistive heating elements 234. Accordingly, more than one carrier member 232 per resistive heating element 234 is provided in this form of the present disclosure. It should be understood that such variations for the carrier members shall be construed as being within the scope of the present disclosure and thus the specific shapes and orientations of the carrier members as illustrated and described herein shall not be construed as limiting the scope of the present disclosure.

Figure 37:
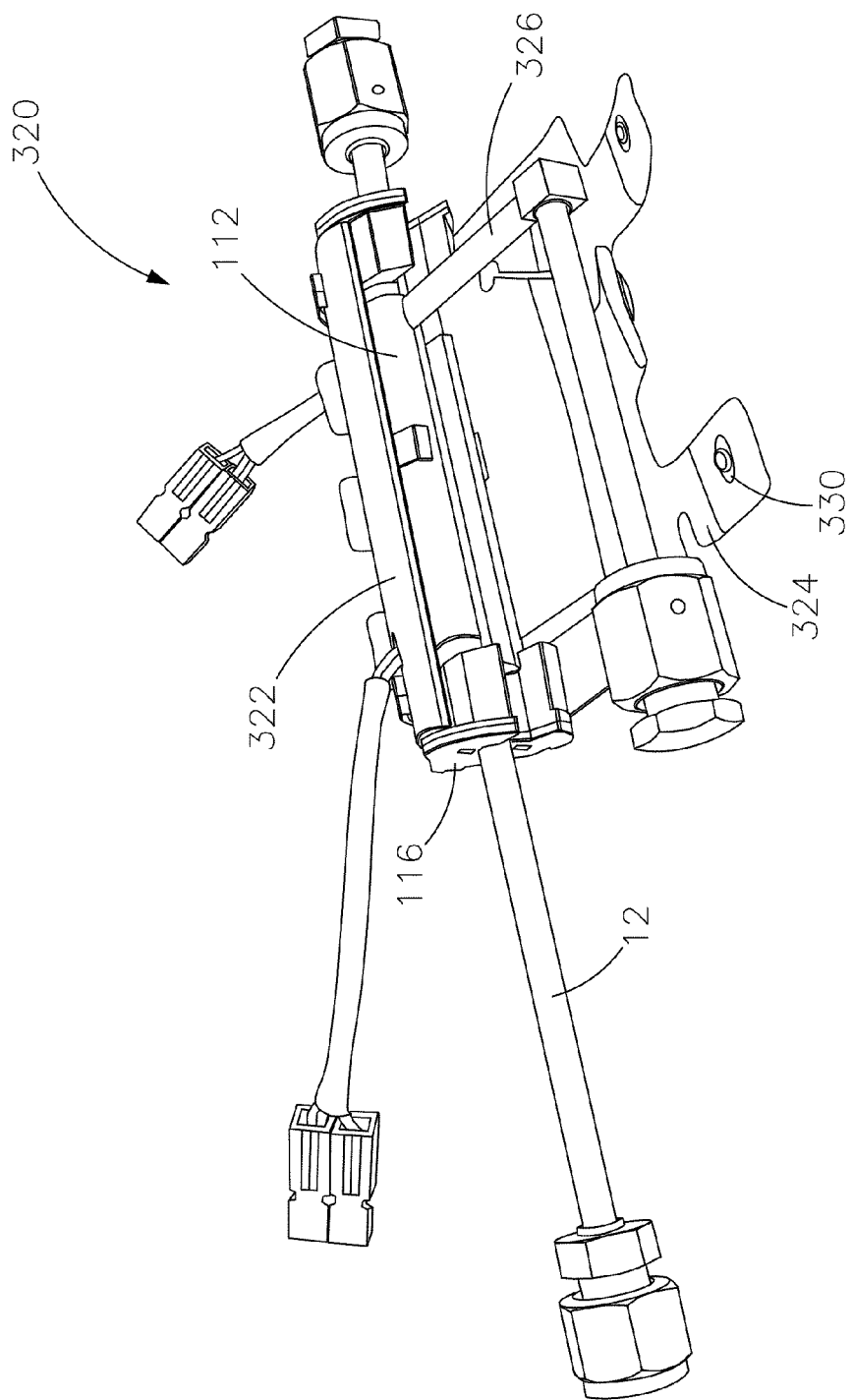
FIG. 37 is a perspective view of a heater system having a hybrid cover constructed in accordance with the principles of the present disclosure.
Figure 38:
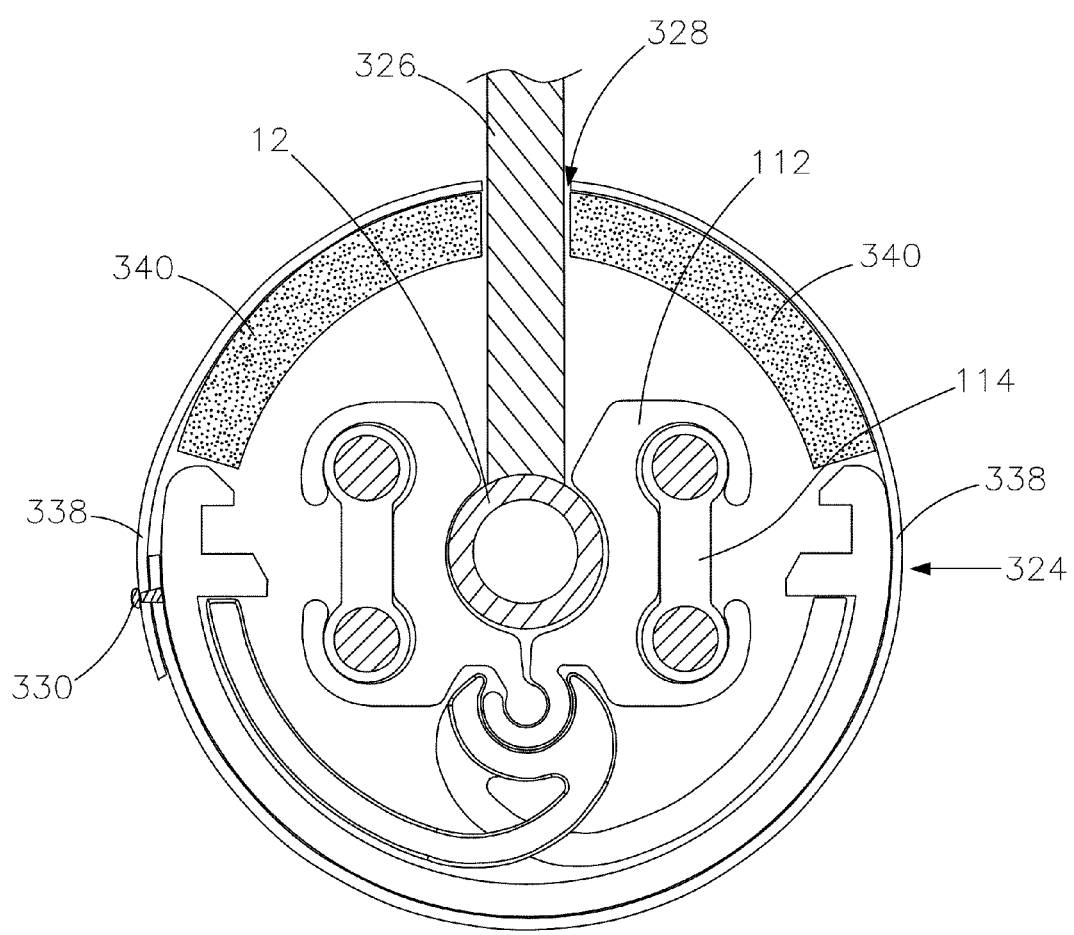
FIG. 38 is a cross-sectional view of the heater system, illustrating the cover accommodating a fitting of a heating target in accordance with the principles of the present disclosure.
Figure 39:
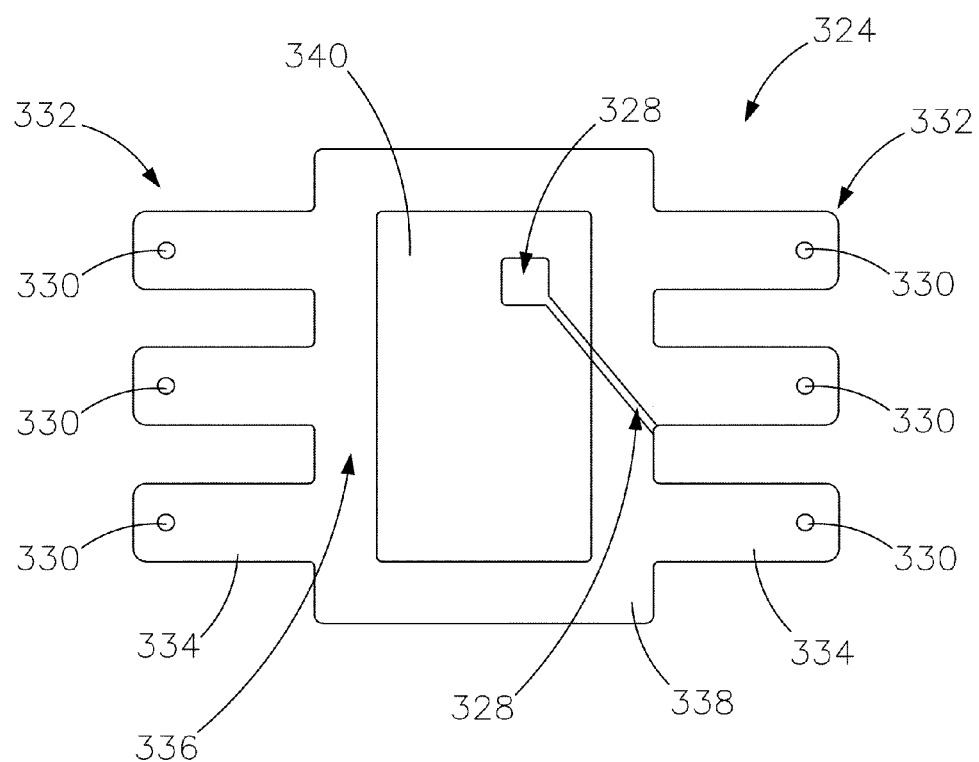
FIG. 39 is a top view of a second, flexible cover constructed in accordance with the principles of the present disclosure.

Referring to FIGS. 37-39, a heater system having a hybrid cover is illustrated and generally indicated by reference numeral 320. The heater system 320 comprises a plurality of hinged carrier members 112 as previously set forth, along with a plurality of heat trace sections 114 and end fittings 116. Advantageously, the hybrid cover comprises a first cover 322 disposed around at least a portion of the hinged carrier members 112 and the heat trace sections 114, and a second cover 324 operatively engaged with the first cover 322. In one form, the first cover 322 is rigid, and the second cover 324 is flexible as described in greater detail below.

The second cover 324 is designed to accommodate a fitting 326 (or a plurality of fittings) that is present along the heating target 12. As such, the second cover 324 is adapted for detachable placement around at least a portion of the hinged carrier members 112 and the heat trace sections 114. More specifically, and with reference to FIGS. 38 and 39, the second cover 324 in one form is flexible and comprises cutouts 328 to accommodate the fitting 326 so that the heater system 320 can be readily installed onto and removed from the heating target 12. Additionally, the second cover 324 further comprises a fastening mechanism, and in this form snaps 330, to secure the second cover 324 around the heater system 320. In the form as shown, there are three (3) snaps 330 disposed at end portions 332 of tabs 334 extending from a central portion 336 of the second cover 324. It should be understood that any number of snaps 330 or fastening mechanisms can be used while remaining within the scope of the present disclosure. Other fastening mechanisms may include, by way of example, Velcro®, magnetic elements, lacing, latches, and straps. It should be understood that other forms of fastening mechanisms are to be construed as falling within the scope of the present disclosure.

As further shown, the second cover 324 comprises an outer jacket 338 and an inner insulating member 340. The outer jacket 338 in one form is a silicone rubber material, and the inner insulating member 340 is also a silicone rubber material, in the form of a foam. As described in greater detail below, this foam material form may be preformed to accommodate varying geometries of a heating target, and thus the shape and configuration as shown herein is merely exemplary and should not be construed as limiting the scope of the present disclosure.

The second cover 324 is secured to the first cover 322 using an adhesive material, although other attachment mechanisms may be used. Alternately, the second cover 324 is not physically attached to the second cover 324 and is instead located by the fastening mechanisms and by components of the heating target 12. With being secured to the first cover 322 and configured to wrap around the hinged carrier members 112 and the heat trace sections 114, the second cover 324 is operatively engaged with the first cover 322 and adapted for detachable placement in accordance with the teachings of the present disclosure.

Figure 40:
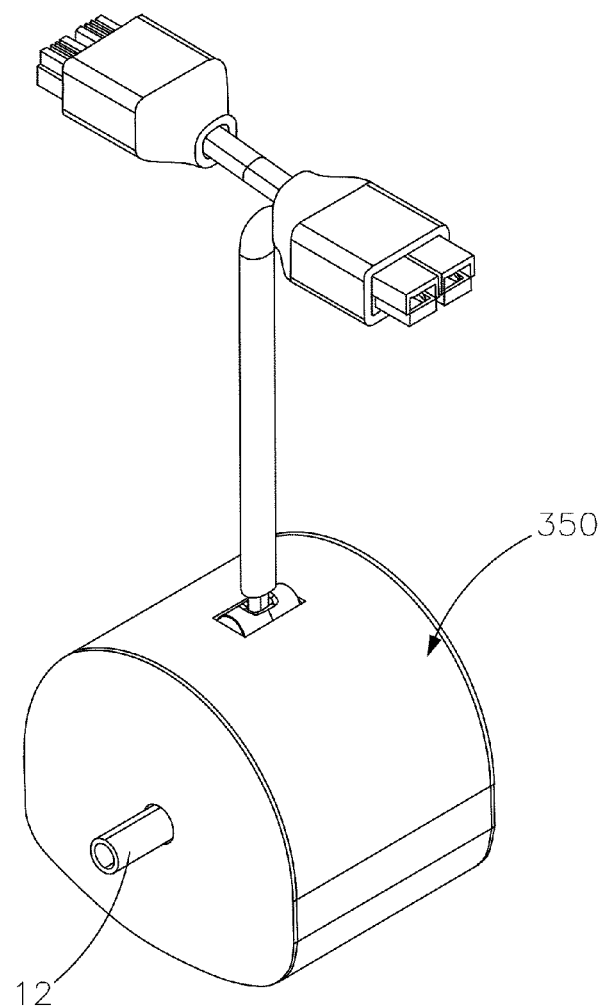
FIG. 40 is a perspective view of a connector assembly having a flexible insulation jacket constructed in accordance with the principles of the present disclosure.
Figure 41:
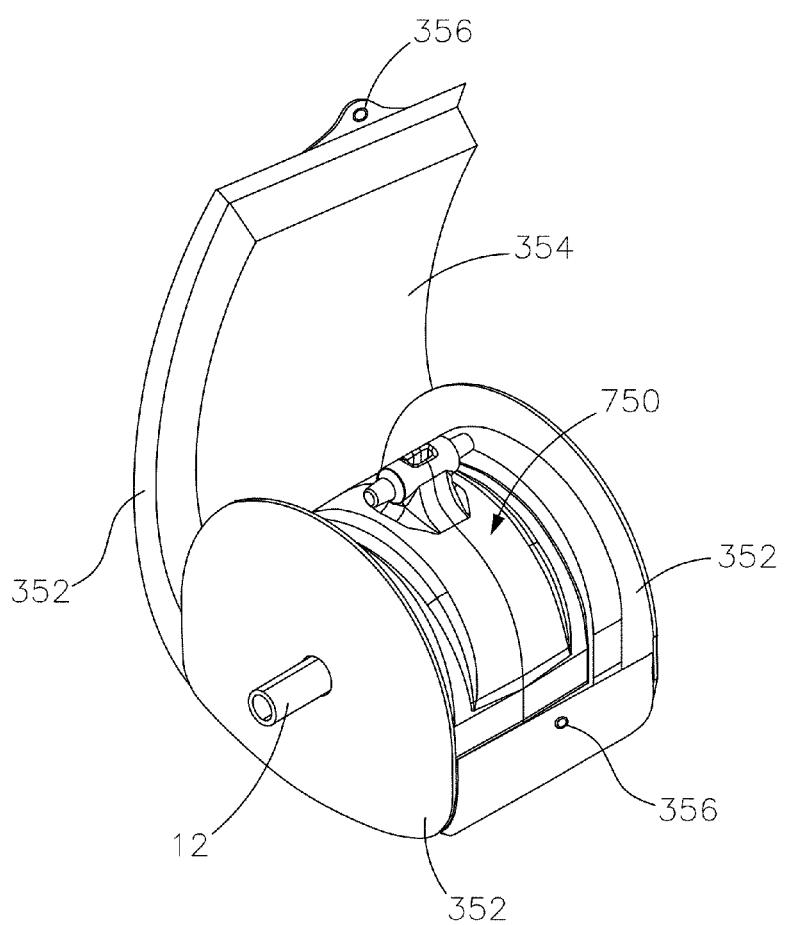
FIG. 41 is a perspective view of the flexible insulation jacket unfastened from the connector assembly in accordance with the principles of the present disclosure.
Figure 42:
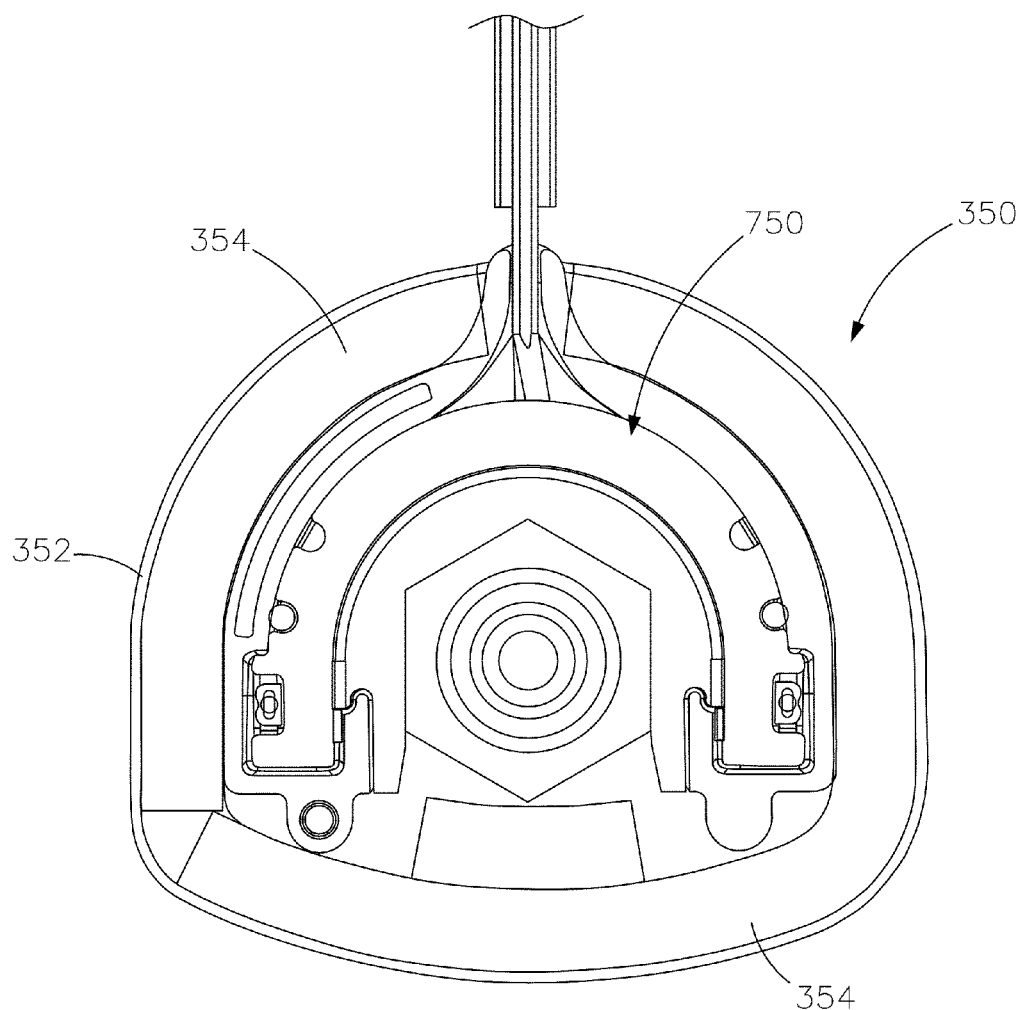
FIG. 42 is a cross-sectional view of the connector assembly in accordance with the principles of the present disclosure.

Referring now to FIGS. 40-42, the concept of the flexible second cover 324 as set forth above is extended to the connector assembly 504 as previously set forth (FIGS. 14-23). As shown, an insulation jacket 350 is disposed around the fitting heater assembly 750 (also shown in FIGS. 18-20). The insulation jacket 350 in one form is a flexible silicone rubber material, comprising an outer jacket 352 and inner insulation members 354. The inner insulation members 354 in one form are silicone rubber foam, and may be preformed to conform to varying geometries of the heating target 12. Additionally, the insulation jacket 350 in comprises a fastening mechanism, which in this form is a snap 356, to secure the insulation jacket 350 around the fitting heater assembly 750.

Figure 43:
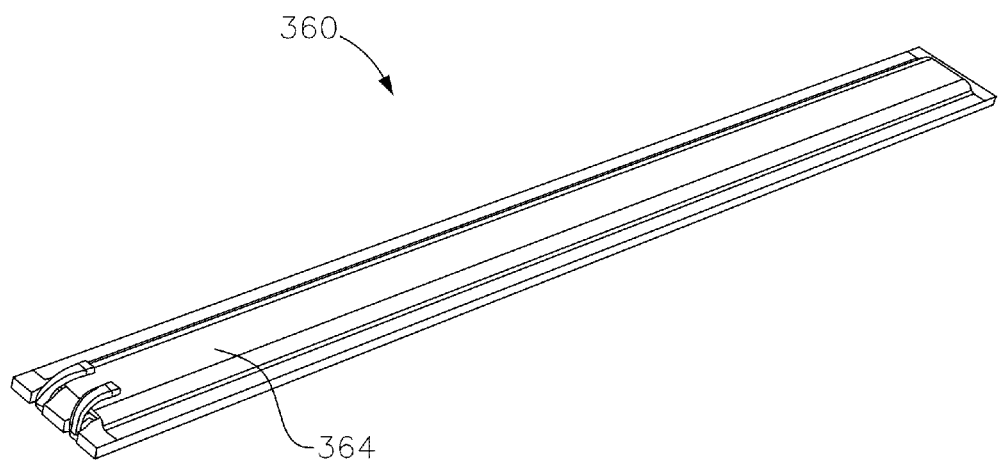
FIG. 43 is a perspective view of a heater system having a heat trace section and insulating members constructed in accordance with the principles of the present disclosure.
Figure 44:
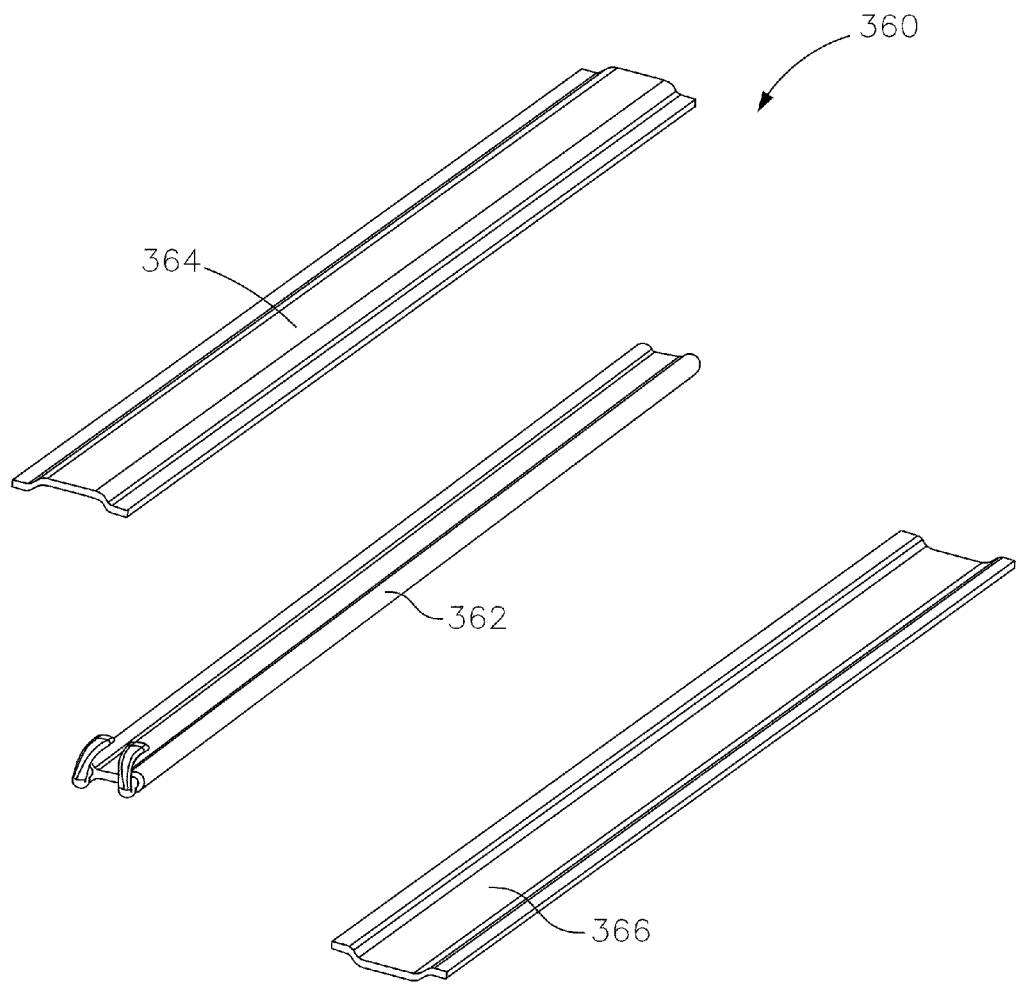
FIG. 44 is an exploded view of FIG. 43 in accordance with the principles of the present disclosure.
Figure 45:
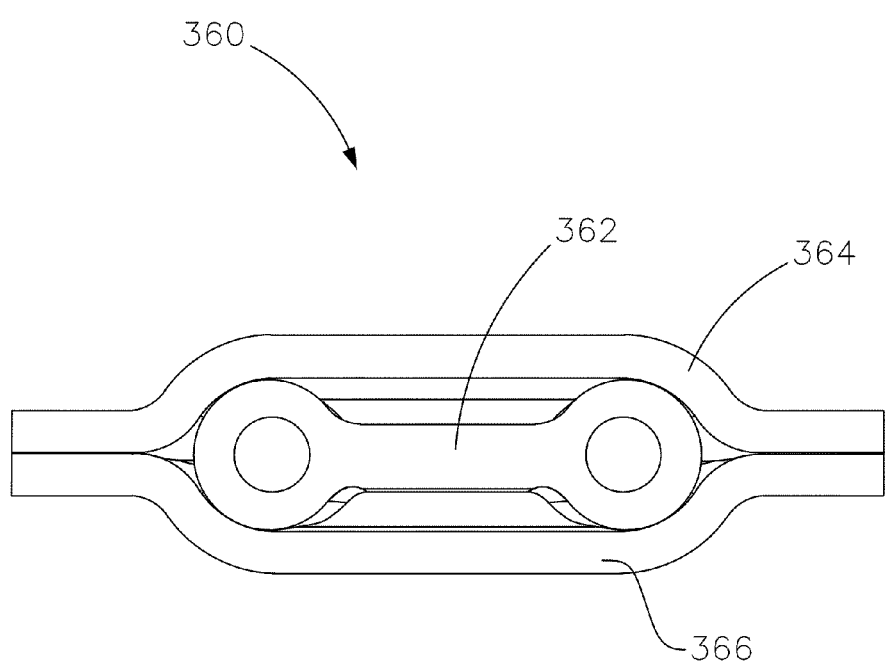
FIG. 45 is a cross-sectional view of the heater system of FIG. 43 in accordance with the principles of the present disclosure.

As shown in FIGS. 43-45, another form of a heater system is illustrated and generally indicated by reference numeral 360. The heater system 360 comprises at least one heat trace section 362, a first insulating member 364 disposed adjacent the heat trace section 362, and a second insulating member 366 disposed opposite the first insulating member 364 and adjacent the heat trace section 362. The first and second insulating members 364, 366 are secured to each other and encapsulate the heat trace section 362 as shown. In one form, the first and second insulating members 364, 366 are a flexible silicone rubber material. It should be understood, however, that other types of insulating materials may be employed while remaining within the scope of the present disclosure. Additionally, the first and second insulating members may be a single unitized member in another form of the present disclosure, rather than the two (2) members as illustrated herein.

Figure 46:
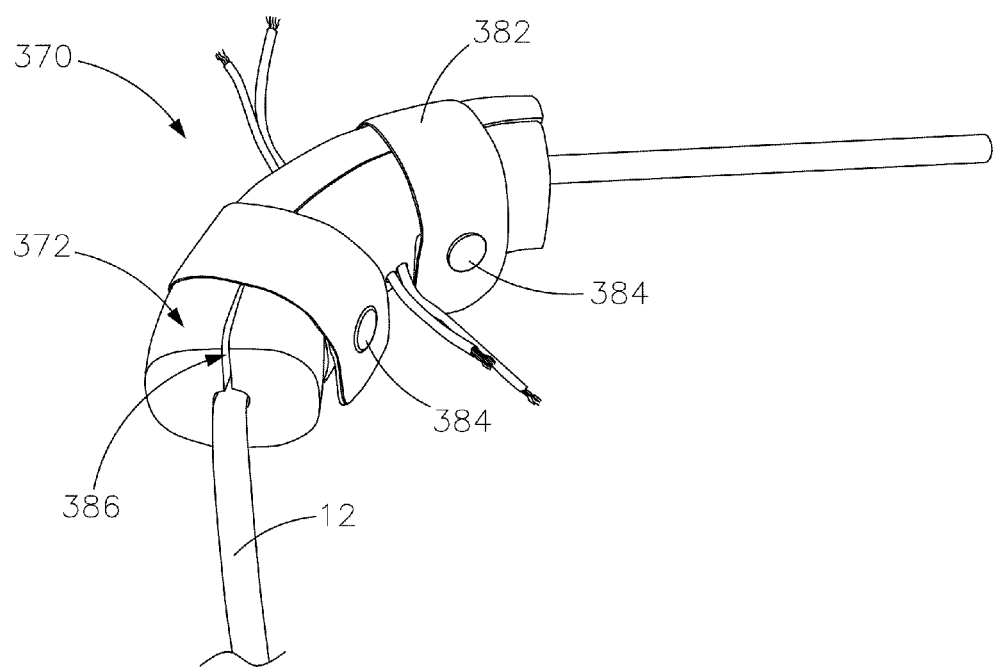
FIG. 46 is a perspective view of a heater system disposed around a curved heating target and constructed in accordance with the principles of the present disclosure.
Figure 47:
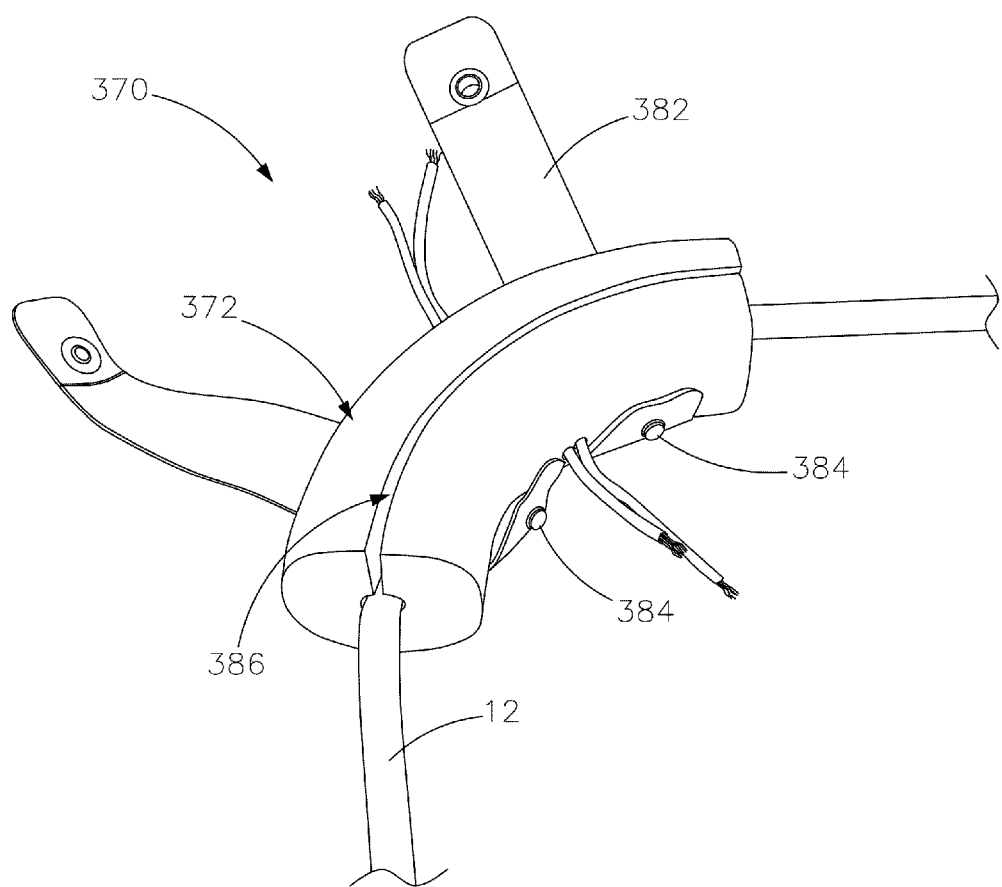
FIG. 47 is a perspective view of the heater system of FIG. 46 having its cover unfastened in accordance with the principles of the present disclosure.
Figure 48:
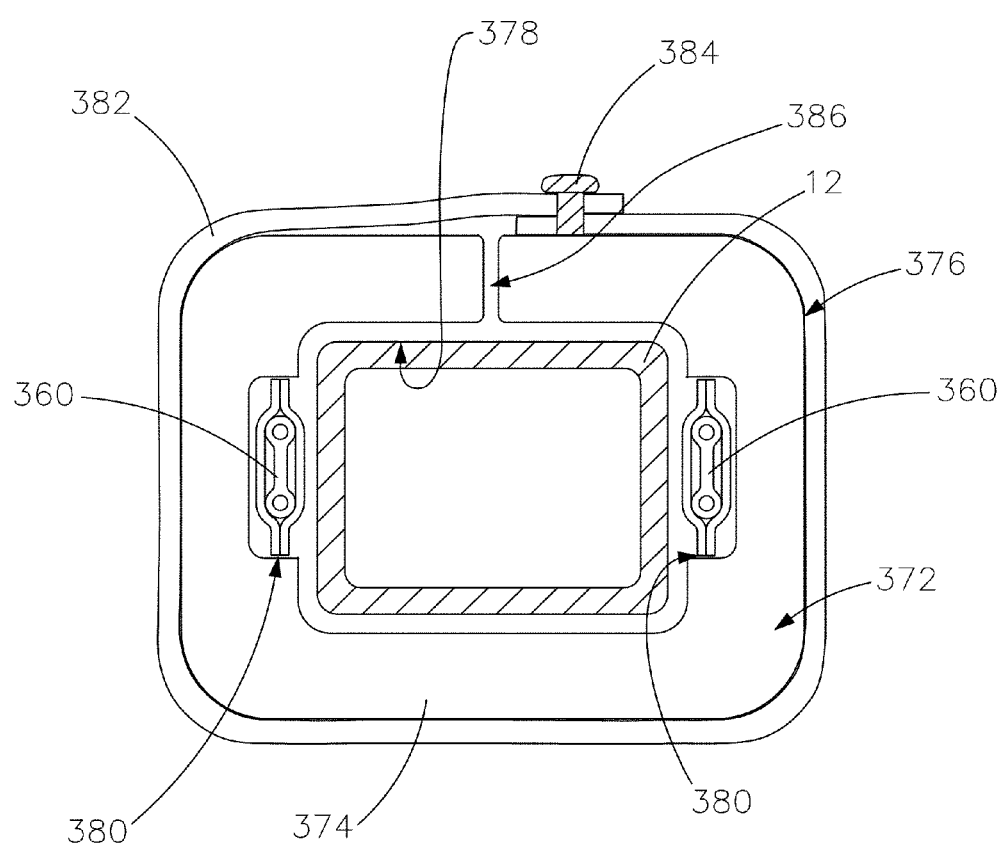
FIG. 48 is a cross-sectional view of a heater system similar to that of FIG. 46 in accordance with the principles of the present disclosure.

Referring now to FIGS. 46-48, the heater system 360 as set forth above is employed within a construction adapted for placement around varying geometries of a heating target. More specifically, a heater system 370 comprises a thermal insulation jacket 372 comprising a body 374 defining an outer wall 376 and an inner wall 378 with at least one pocket 380 disposed along the inner wall 378. (See also, FIG. 9). The encapsulated heating element, or heater system 360, is disposed within this pocket 380 as shown. Furthermore, a cover 382 is disposed around the thermal insulation jacket 372.

In one form, the thermal insulation jacket 372 is a preformed silicone rubber foam material. Additionally, the cover 382 in one form is a flexible silicone rubber material. As shown, the cover 382 comprises a fastening mechanism, which are snaps 384 in this form, to secure the heater system 370 around a heating target 12. The cover 382 may be adhesively bonded to the thermal insulation jacket 372 for proper placement. It should be understood that other fastening mechanisms other than snaps, such as Velcro® or elements as set forth above, may be employed while remaining within the scope of the present disclosure.

As further shown, the thermal insulation jacket 372 comprises a longitudinal slit 386 to allow the heater system 370 to be resiliently installed onto and removed from a heating target. Moreover, the thermal insulation jacket 372 comprises a shape commensurate with the heating target 12. In this exemplary form, the thermal insulation jacket 372 is curved to match the curvature of the heating target 12. In other forms, the thermal insulation jacket 372 may be straight or take on other polygonal or splined shapes while remaining within the scope of the present disclosure.

Figure 50:
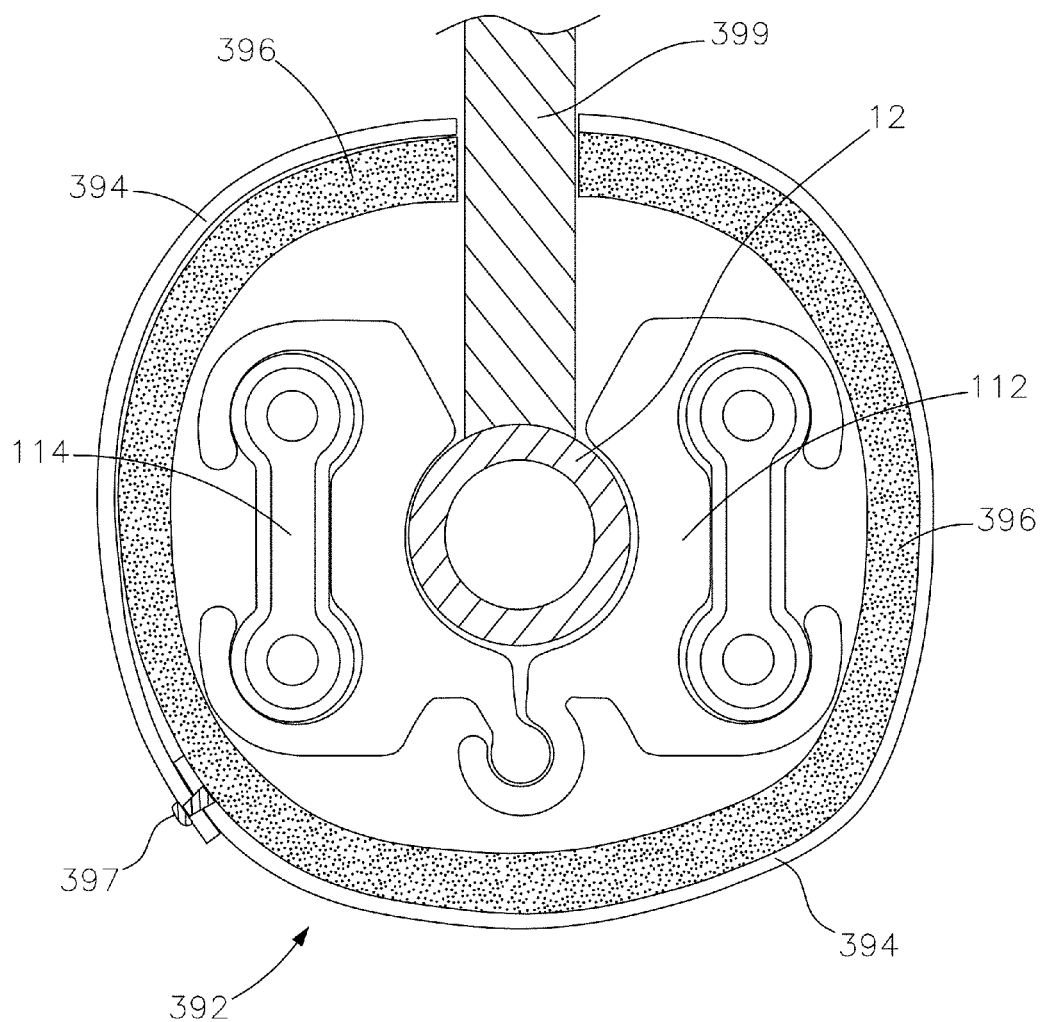
FIG. 50 is a cross-sectional view of the flexible cover installed with the heater system of FIG. 49 in accordance with the principles of the present disclosure.

Referring to FIGS. 49 and 50, yet another form of a heater system in accordance with the present disclosure is illustrated and generally indicated by reference numeral 390. The heater system 390 is similar to the heater system 320 shown in FIGS. 37-39, with the exception that a continuous, flexible cover 392 is disposed around the carrier members 112 and heat trace sections 114, rather than a portion being rigid and a portion being flexible as previously described. More specifically, the flexible cover 392 comprises an outer jacket 394 and an inner insulating members 396. The outer jacket 394 in one form is a silicone rubber material, and the inner insulating members 396 are also a silicone rubber material, in the form of a foam. As set forth above, this foam material form may be preformed to accommodate varying geometries of a heating target, and thus the shape and configuration as shown herein is merely exemplary and should not be construed as limiting the scope of the present disclosure. Additionally, various cutouts 398 in the flexible cover 392 may be provided as previously set forth, in order to accommodate varying geometries of the heating target, such as the fitting 399.

The flexible cover 392 is also provided with a fastening mechanism, as previously set forth, in one form of the present disclosure. As shown, the fastening mechanism is snaps 397, however, it should be understood that other fastening mechanisms, such as those previously set forth herein, are to be construed as being within the scope of the present disclosure. The flexible cover 392 in one form is secured to the end fittings 116 and in another form may simply abut the end fittings 116. As such, the flexible cover 392 is operatively engaged with the end fittings 116 and adapted for detachable placement around at least a portion of the hinged carrier members 112 and the heat trace sections 114. Additionally, the flexible cover 392 is adapted for detachable placement around at least a portion of the hinged carrier members 112 and the heat trace sections 114 with the use of fastening mechanisms, cutouts, and its flexible nature.

Although the above-described heater systems have been illustrated and detailed as having a construction similar to a conventional heat trace cable, it should be understood that other types of heater construction besides a heat trace cable construction may also be employed while remaining within the scope of the present disclosure. A heater type such as a polymer heater or a layered film heater, among others, should be construed as being within the scope of the present disclosure. It should also be understood that other materials for the insulation jackets and covers besides the silicone rubber as set forth herein may be employed while remaining within the scope of the present disclosure. For example, other materials may include a polyimide or Aerogel®, among others.

The description of the disclosure is merely exemplary in nature and, thus, variations that do not depart from the gist of the disclosure are intended to be within the scope of the disclosure. For example, the conductive polymer material used for the heat trace sections may be a semi-conductive material in order to self-regulate temperature or a non-semi-conductive material such that temperature is not regulated through the material but rather through a control system. Additionally, the thermal insulation jackets may be fitted with an external shell, e.g. rigid plastic, of any shape or geometry, in order to protect the thermal insulation jackets from damage from the outside environment. Such variations are not to be regarded as a departure from the spirit and scope of the disclosure.

What is claimed is:

1. A heater system defining a space for receiving and heating a heating target therein, comprising:
    a pair of hinged carrier members extending along a longitudinal direction and jointly defining the space, each hinged carrier member defining an inner periphery surface extending along the longitudinal direction for contacting the heating target, an outer receiving portion opposing the inner periphery surface and extending along the longitudinal direction, the hinged carrier members being removably engaged at mating connection portions defining a hinge for rotatably joining the hinged carrier members;
    a plurality of heat trace sections disposed within the outer receiving portions of the hinged carrier members;
    end fittings each defining an opening to allow the heating target to be disposed therethrough, the hinged carrier members being disposed between the end fittings;
    a first cover disposed around at least a portion of the hinged carrier members and the heat trace sections, the first cover being secured to the end fittings; and a second cover operatively engaged with the first cover and adapted for detachable placement around at least a portion of the hinged carrier members and the heat trace sections.

2. The heater system according to claim 1, wherein the first cover is rigid and the second cover is flexible.

3. The heater system according to claim 1, wherein the second cover is flexible and comprises a silicone rubber material.

4. The heater system according to claim 1, wherein the second cover further comprises a fastening mechanism to secure the second cover around the hinged carrier members and the heat trace sections.

5. The heater system according to claim 4, wherein the fastening mechanism is selected from the group consisting of snaps, Velcro, magnetic elements, lacing, latches, and straps.

6. The heater system according to claim 1, wherein the second cover comprises cutouts to accommodate a protruded portion of the heating target.

7. A heater comprising:
    at least one heat trace section comprising:
        a pair of bus-conductors;
        a semiconductive polymer material surrounding the bus-conductors and functioning as a heating element;
        a dielectric material surrounding the semiconductive polymer material; and
        an outer insulating jacket surrounding the dielectric material;
    a first insulating member disposed adjacent the heat trace section;
    a second insulating member disposed opposite the first insulating member and adjacent the heat trace section, the first and second insulating members being secured to each other and encapsulating the heat trace section,
    wherein the first and second insulating members each define a pair of flat portions extending along longitudinal sides of the at least one heat trace and facing each other and a curved portion between the pair of the flat portions, the flat portions of the first and second insulating members being in contact, the flat portions and the curved portions of the first and second insulating members jointly enclosing the heat trace section.

8. The heater according to claim 7, wherein the first and second insulating members are a silicone rubber material.

9. The heater according to claim 7, wherein the first and second insulating members are portions of a single-piece member.

10. A heater system defining a space for receiving and heating a heating target therein, the heater system comprising:
    a thermal insulation jacket comprising a body defining an outer wall and an inner wall, the body comprising at least one pocket disposed along the inner wall, the inner wall defining the space, the pocket recessed from the inner wall and open to the space;
    at least one encapsulated heating element disposed within the pocket, the encapsulated heating element comprising:
        at least one heat trace section comprising:
            a pair of bus-conductors;
            a semiconductive polymer material surrounding the bus-conductors and functioning as a heating element;
            a dielectric material surrounding the semiconductive polymer material; and
            an outer insulating jacket surrounding the dielectric material;
        a first insulating member disposed adjacent the heat trace section;
        a second insulating member disposed opposite the first insulating member and adjacent the heat trace section, the first and second insulating members being secured to each other and encapsulating the heat trace section; and
    a cover disposed around the thermal insulation jacket.

11. The heater system according to claim 10, wherein the thermal insulation jacket is a preformed silicone rubber material.

12. The heater system according to claim 10, wherein the cover comprises a fastening mechanism to secure the heater system around a heating target.

13. The heater system according to claim 12, wherein the fastening mechanism is selected from the group consisting of snaps, Velcro, magnetic elements, lacing, latches, and straps.

14. The heater system according to claim 10, wherein the cover is a silicone rubber material.

15. The heater system according to claim 10, wherein the thermal insulation jacket comprises a longitudinal slit to allow the heater system to be resiliently installed onto and removed from the heating target.

16. The heater system according to claim 10, wherein the thermal insulation jacket comprises a shape commensurate with the heating target.

17. A heater system defining a space for receiving and heating a heating target therein, comprising:
    a pair of hinged carrier members extending along a longitudinal direction and jointly defining the space, each hinged carrier member defining an inner periphery surface extending along the longitudinal direction for contacting the heating target, an outer receiving portion opposing the inner periphery surface, the hinged carrier members being removably engaged at a connection portion on each of the hinged carrier members, defining a hinge for rotatably joining the pair of hinged carrier members;
    a plurality of heat trace sections disposed within the outer receiving portions of the hinged carrier members, the heat trace sections defining ends;
    end fittings each defining an opening to allow the heating target to be disposed therethrough, the hinged carrier members disposed between the end fittings;
    a flexible cover operatively engaged with the end fittings and adapted for detachable placement around at least a portion of the hinged carrier members and the heat trace sections.

18. The heater system according to claim 17, wherein the flexible cover comprises a silicone rubber material.

19. The heater system according to claim 17, wherein the flexible cover further comprises a fastening mechanism to secure the flexible cover around the hinged carrier members and the heat trace sections.

20. The heater system according to claim 19, wherein the fastening mechanism is selected from the group consisting of snaps, Velcro, magnetic elements, lacing, latches, and straps.

21. The heater system according to claim 17, wherein the flexible cover comprises cutouts to accommodate a protruded portion of the heating target.

* * * * *